US008978768B2

(12) United States Patent  
Curry

(10) Patent No.: US 8,978,768 B2  
(45) Date of Patent: Mar. 17, 2015

(54) CLAMPING ARRANGEMENTS

(75) Inventor: Peter James Curry, Ashtead (GB)

(73) Assignee: Britannia Engineering (Isle of Man) Limited, Douglas (IM)

( * ) Notice: Subject to any disclaimer, the term of this patent is extended or adjusted under 35 U.S.C. 154(b) by 513 days.

(21) Appl. No.: 13/203,766

(22) PCT Filed: Feb. 26, 2010

(86) PCT No.: PCT/GB2010/050348  
§ 371 (c)(1),  
(2), (4) Date: Nov. 10, 2011

(87) PCT Pub. No.: WO2010/100473  
PCT Pub. Date: Sep. 10, 2010

(65) Prior Publication Data  
US 2012/0045271 A1 Feb. 23, 2012

(30) Foreign Application Priority Data

Mar. 3, 2009 (GB) .................................. 0903520.5  
Jun. 12, 2009 (GB) .................................. 0910151.0

(51) Int. Cl.  
*E21B 41/04* (2006.01)  
*E02D 29/02* (2006.01)  
*F16L 1/26* (2006.01)

(52) U.S. Cl.  
CPC .............. *E02D 29/0258* (2013.01); *F16L 1/26* (2013.01)  
USPC ....................................................... 166/338

(58) Field of Classification Search  
USPC ................. 166/338, 339, 341, 344, 351, 365; 405/231, 251  
See application file for complete search history.

(56) References Cited

U.S. PATENT DOCUMENTS

| 3,954,137 | A | * | 5/1976 | Baugh ............................ 166/351 |
| 4,057,267 | A | * | 11/1977 | Jansen, Jr. ........................ 285/18 |
| 5,468,023 | A | | 11/1995 | Galle et al. |

FOREIGN PATENT DOCUMENTS

| GB | 2024919 A | * | 1/1980 | ................ E05C 1/06 |
| GB | 2296301 A | * | 6/1996 | .............. F16L 37/28 |
| GB | 2320541 A | * | 6/1998 | .............. F16L 37/56 |
| GB | 2391052 A | | 1/2004 | |
| WO | WO-2008/073014 A1 | | 6/2008 | |
| WO | WO-2009/027694 A2 | | 3/2009 | |

OTHER PUBLICATIONS

Fromentel, Henri, "International Search Report", for PCT/GB2010/050348, as mailed Dec. 17, 2010, 4 pages.

* cited by examiner

*Primary Examiner* — Michael P Ferguson  
(74) *Attorney, Agent, or Firm* — Winstead PC

(57) ABSTRACT

An underwater clamping arrangement (100, 100') is provided for fixing at least a first and a second member (1, 2) together, to prevent relative movement between the members along at least a longitudinal axis (2L). The clamping arrangement comprises at least a fixed portion (102, 102') attached to the first member and a reaction portion (104, 104') attachable to the fixed portion, and a forcing portion (106, 106'). The forcing portion is arranged to apply a clamping force (4F, 4G) in a direction along a forcing axis (2F) substantially perpendicular to the longitudinal axis between the reaction portion and the second member so to fix the two members together. The reaction portion and forcing portion are removable from the fixed portion when the clamping arrangement is clamped.

17 Claims, 25 Drawing Sheets

CLAMPING ARRANGEMENTS

BRIEF SUMMARY OF THE INVENTION

The present invention relates to clamping arrangements for fixing two members together to prevent movement.

Underwater clamping arrangements for use in subsea environments are subject to particular constraints and requirements arising from the remote and potentially dangerous environment where they are used. In applications such as piling or the attachment of subsea structural assemblies, such clamping arrangements are used for fixing two concentric tubes together. Clamping arrangements should operate to fix two longitudinal members together quickly and reliably using high clamping forces to resist high axial loads. A disadvantage of known arrangements is that they are time consuming to operate, and many arrangements are not capable of providing an adequate clamping load. Many of the known arrangements are difficult to release when a structure reaches the end of its life, and add to the cost and complexity of removal and salvage.

Our co pending Patent Application PCT/GB2008/002936 describes a particular arrangement utilising permanent elements but with only a removable jack.

For the purpose of this application, the term jack may be an hydraulic cylinder that when powered by a hydraulic power supply is arranged to cause movement of two opposing end faces of the cylinder perpendicular to a longitudinal centre axis of the cylinder, and hence the jack may be arranged to induce a load in a direction along the said axis.

It is an object of the present invention to provide an underwater clamping arrangement. This object can be achieved by the features as defined by the independent claim. Further enhancements are characterized by the dependent claims.

According to one embodiment an underwater clamping arrangement is provided for fixing at least a first and a second member together, to prevent relative movement between the members along at least a longitudinal axis, the clamping arrangement comprising at least a fixed portion attached to the first member and a reaction portion attachable to the fixed portion, and a forcing portion, the forcing portion arranged to apply a clamping force in a direction along a forcing axis substantially perpendicular to the longitudinal axis between the reaction portion and the second member so to fix the two members together, the reaction portion and forcing portion being removable from the fixed portion when the clamping arrangement is clamped.

A benefit of the clamping apparatus of at least one embodiment is that the installed costs of the clamping arrangement can be significantly reduced.

A further benefit is that a protrusion from a side of the first member is reduced, significantly reducing a hazard to cables drawn underwater, such as for fishing nets or underwater activities.

Preferably the clamping means comprises a releasable locking means, the locking means arranged to maintain the clamping force when locked. A benefit of the locking means is that reliable clamping can be achieved for an indefinite period. A high clamping force can be achieved by the use of a hydraulic cylinder without risk of relaxation arising from loss of hydraulic pressure.

Preferably the locking means is adjustable. A benefit of the adjustable locking means is that the majority of the maximum achieved clamping force can be locked into the clamping arrangement.

Preferably the locking means comprises a moveable part, moveable in a direction parallel to or about the forcing axis, the moveable part moveable so as to lock the clamp. A benefit of such a moveable part, for example a rotatable threaded collar or nut mounted on a screw thread along the forcing axis is that reliable retention of the clamping force is easily obtained.

Preferably the locking means comprises a moveable part, moveable in a direction perpendicular to the forcing axis, the moveable part moveable so as to lock the clamp. A benefit of such a moveable part, moveable in a perpendicular direction, for example a wedge, is that it is quick and simple to actuate.

Preferably the locking means is self activating and arranged to maintain the delivered clamping force within the fixed portion as the clamping force load increases incrementally. A benefit of the locking means activating as the clamping force is applied, is that at each incremental load stage the clamping force is maintained and it cannot be released by accidental relaxation of the hydraulic pressure.

Preferably the forcing portion comprises a hydraulically operated cylinder. A benefit of the use of a hydraulic cylinder is that a high clamping force can be obtained. A further benefit is that the actual clamping force used can be readily monitored, calculated and controlled by measuring the pressure of the hydraulic supply to the cylinder.

Preferably the forcing part is removable while the reaction portion is attached to the fixed portion. A benefit of the forcing part being removable is that a faulty hydraulic cylinder or associated hydraulic lines and valves may be easily replaced.

Preferably the reaction portion and forcing portion are removed by moving in a direction perpendicular to the forcing axis. A benefit of the removable portions being removed in a perpendicular direction, is that application of clamping force can not dislodge the removable portions. Hence safety is improved.

Preferably the removable portion engages slidably with the fixed portion. A benefit of slidable engagement is that it ensures reliable, quick, and repeatable engagement.

Preferably the removable portion and the fixed portion each comprise inter-engagable hook portions, the hook portion on the removable portion arranged to engage the hook portion on the fixed portion to retain the removable portion to the fixed portion.

A benefit of the inter-engagable hook portions is that repeatable positioning of the removable portion with fixed portion can be easily achieved underwater.

A further benefit is that the hook portions when orientated substantially vertically will tend to remain clear of debris.

A further benefit is that the relative sliding motion of the fixed and removable portions as they engage further ensures the mating surfaces are clean.

Preferably the removable portion is retained to the fixed portion by the effect of gravity. A benefit of using the effect of gravity to retain the removable portions in place is that no additional operation is required to effect separation of the removable portion from the fixed portion.

Preferably the fixed and movable portions are shaped to encourage self alignment of the movable portion by the effect of gravity. A benefit of the self alignment is that no additional operation is required to manoeuvre and align the removable portion with respect to the fixed portion.

According to one embodiment, there is provided a tubular clamping arrangement for fixing two concentric tubes together comprising a pressure inducing member to expand or contract one said tube or part thereof onto the other said tube, the clamping arrangement further comprising a pressure resisting member, the pressure inducing member acting between the pressure resisting member and the said tube or part thereof, wherein at least the pressure resisting member is arranged to be moveable.

A benefit of the clamping arrangement comprising a pressure resisting member is that the pressure inducing member can act against a reacting portion or member when the pressure resisting member is attached so as apply pressure to the moveable clamping portions to urge them against the said one tube.

Preferably the pressure inducing member is removable. Hence in an embodiment of the invention, both a jack and a Reaction Plate are movable elements.

A benefit of both the pressure inducing member and the pressure resisting member being removable is that a valuable portion of the clamping arrangement may be recovered for use at another clamping arrangement.

In a further embodiment of the invention both a jack and one or more side plate(s) and reaction plate may be moveable elements. The moveable elements are preferably moveable with respect to a frame portion of the clamping arrangement.

Preferably the removable elements are provided with engagement features to engage with corresponding features on a fixed portion of the clamping arrangement.

Preferably the engagement features are arranged to ensure alignment of the pressure inducing member along a forcing axis, perpendicular to a longitudinal axis of the tubular members.

A benefit of at least one embodiment of the invention is to facilitate the deployment and recovery of the clamping arrangement by remotely operated vehicles. This is particularly valuable where the clamping arrangement is being used in applications such as those in deep subsea locations where divers are unable to operate.

For example in deep sea locations, the lifted weight is an important consideration when selecting an Installation Vessel as they have specific crane handling capacities that are often critical. Should the weight be at a threshold value it may be necessary to select a larger more costly vessel.

Preferably the removable portion or unit is arranged to include hydraulic system parts.

Preferably the removable portion or unit is arranged to contain the hydraulic forcing system.

A benefit of the removable unit having the hydraulic system parts is that these are typically the sensitive and costly parts of the equipment. For example these may include one or more jacks, hotstab connectors, hydraulic hoses, pressure intensifiers, valves, gauges, and/or hydraulic fluid containers. A further benefit is that should the hydraulic system become damaged or malfunction these parts can be recovered to the surface and repaired safely and conveniently.

An example of an application in such a deep sea location would be an adjustable leg or a pile within a pile sleeve for a platform or subsea structure on the sea bed.

Preferably the clamping arrangement is arranged so that a thrust member is indefinitely retainable in a loaded state. A benefit of the thrust member being retainable in a loaded state is that the clamping arrangement may be left in a stable clamped state for an indefinite period of time.

Preferably the thrust member is indefinitely retainable in the loaded state when a removable portion is and has been removed from the clamping arrangement.

Preferably in an embodiment the thrust member is retained in the loaded state by a inserting a locking member between the thrust member and a fixed portion of the clamping arrangement.

Preferably the locking member is insertable along an axis perpendicular to a linear axis along the thrust member. A benefit of the locking member is that it may be inserted by a simple linear movement along the said axis.

Preferably the locking member is a wedge shaped member.

Preferably in an embodiment the wedge is arranged to move under the influence of gravity to an inserted position whereby the thrust member is retained in the loaded state.

Preferably in another embodiment the wedge is resiliently urged to an inserted position whereby the thrust member is retained in the loaded state.

Preferably a releasable restraining means is provided to prevent the wedge from being urged to the inserted position.

Preferably the releasable restraining means is a removable retaining pin.

A benefit of a wedge is that it may be inserted as the thrust member is moved to clamp the tubular clamping arrangement, and since its dimension along the axis of movement of the thrust member increases along the length of the wedge, it will accommodate a range of movement of the thrust member, and will resist a relaxation of the clamping force at any stage of the range of movement.

A further benefit is that the wedge may be arranged to be self locking in the inserted position. The wedge may be arranged to be self locking by means of either friction or by means of a stepped interface surface or by means of a high friction surface coating. Hence, no additional operation is required to complete the clamping process.

Preferably a spring return is provided to retract a hydraulically operated forcing means. A benefit of the spring return is that by forcing the Hydraulic Cylinder back to its original length after the hydraulic pressure is released, the removable portion of the clamping arrangement may be more quickly released and recovered to the surface vessel.

Preferably an embodiment may be an underwater clamping arrangement wherein the first member comprises two parts, which are fixable together, so that the second member can be removed laterally from the first member or the first member from the second member, and wherein the fixed portion is attached to one of the two parts.

Preferably an embodiment may be an underwater clamping arrangement wherein the first member is attached axially and directly to a collar, the collar being supported by one or more ring stiffeners to which the fixed portion is attached, and the outside of the collar is free from the first member.

Preferably an embodiment may be an underwater clamping arrangement wherein the reaction portion and the forcing portion are removably arranged to the fixed portion by means of a remotely operated vehicle (a ROV).

Preferably an embodiment may be an underwater clamping arrangement wherein the reaction portion comprises a spring return function for retracting the hydraulic cylinder following loading, the spring return function comprising a bar passing through an opening of the hydraulically cylinder, the bar being attached at one end to a retaining plate and the other end projects through a back plate and passing through a spring, the spring return function being arranged such that by applying pressure within the hydraulic cylinder the retaining plate is moved in one direction thereby compressing the spring and when the hydraulic pressure is released within the hydraulic cylinder the spring moves the retaining plate in the opposite direction.

Specific embodiments of the invention will now be described by way of example with reference to the accompanying drawings in which:

DETAILED DESCRIPTION OF THE INVENTION

Figure 1:
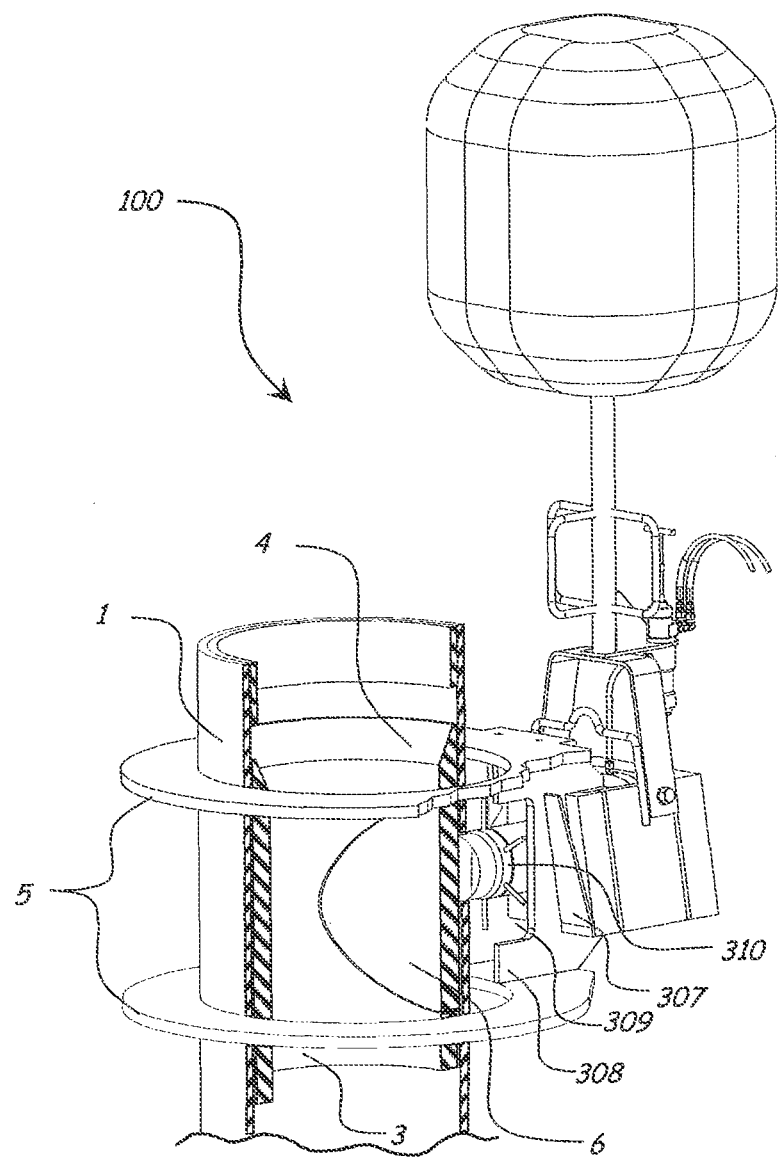
FIG. 1 shows a partly sectioned general arrangement of a first embodiment of a tubular clamping arrangement according to the invention but with an inner tube not shown (note cross-hatching is omitted from this and the following sections for clarity)
Figure 2:
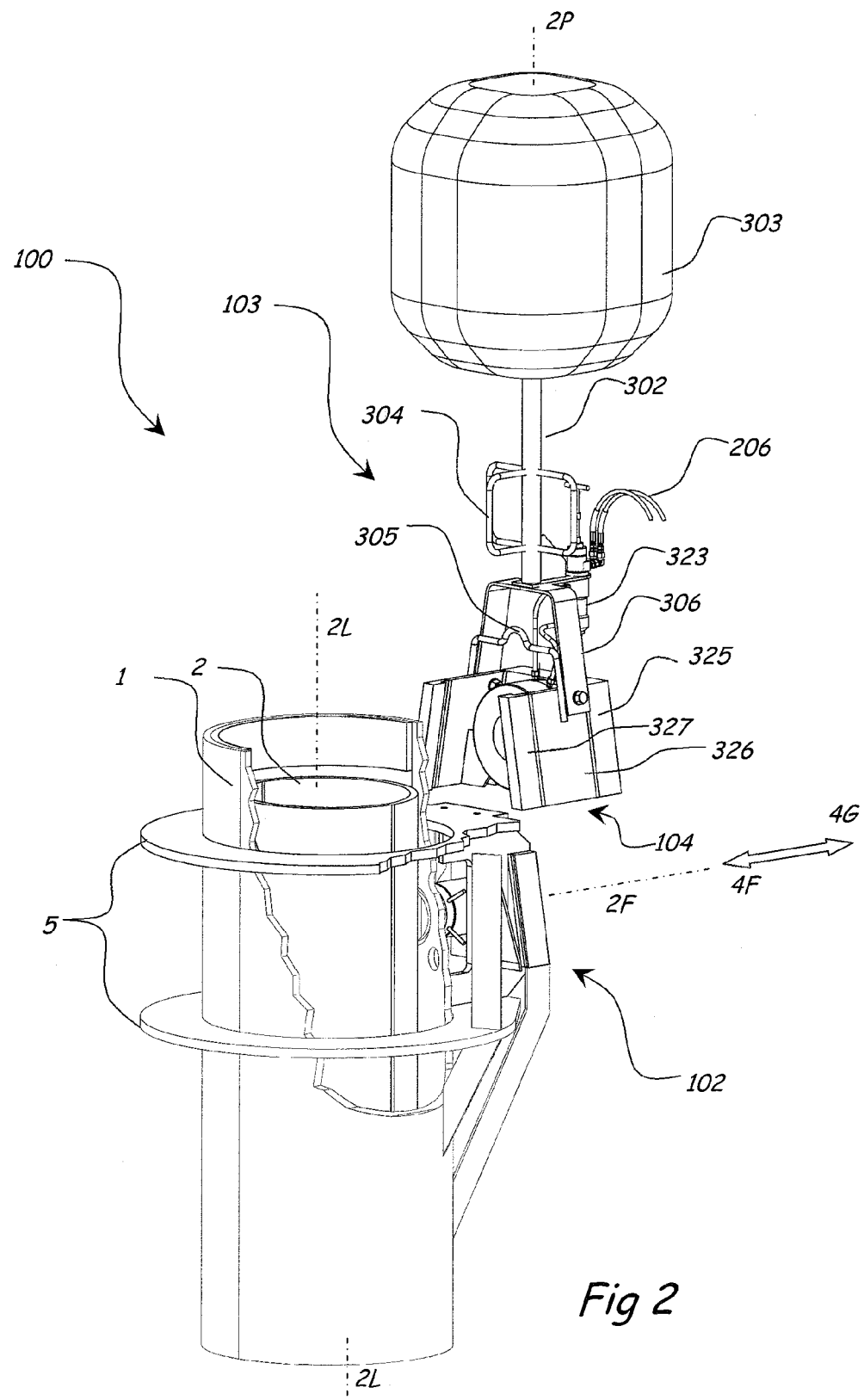
FIG. 2 shows the same view as FIG. 1 with the inner tube in place and with a removable portion of the clamping arrangement separated from another portion, and with a moveable clamping pad omitted for clarity.

FIG. 1 shows the general arrangement of a first embodiment of a clamping arrangement (100) according to the present invention without an Inner Tube (2) whereas FIG. 2 shows the general arrangement with Inner Tube (2) inserted. To clamp two tubes to each other, a Movable Pad (6) is driven or urged towards the Inner Tube (2) by application of a clamping force load through a Thrust Bolt (213) (shown in FIG. 3). This force deforms the Inner Tube (2) elastically against a Grooved Collar (3) creating a high frictional force and developing a clamping action thereby preventing relative axial movement of the tubes.

To enhance the high frictional force the Movable Pad (6) may have a treated or grooved surface to provide high co-efficient of friction between the inner tube and the Movable Pad.

Figure 3:
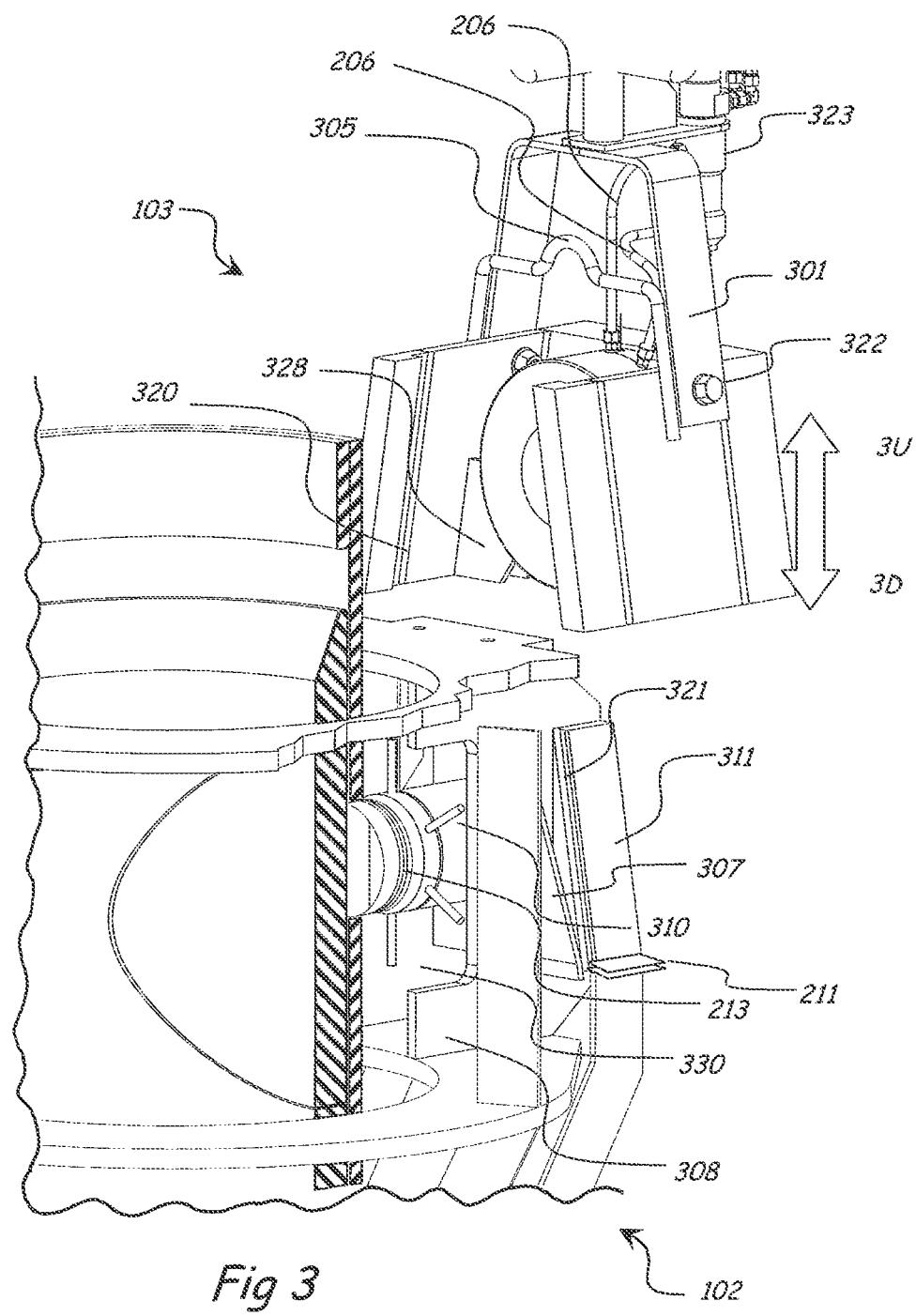
FIG. 3 is an enlarged scrap view of a portion of the clamping arrangement as shown in FIG. 1.
Figure 4:
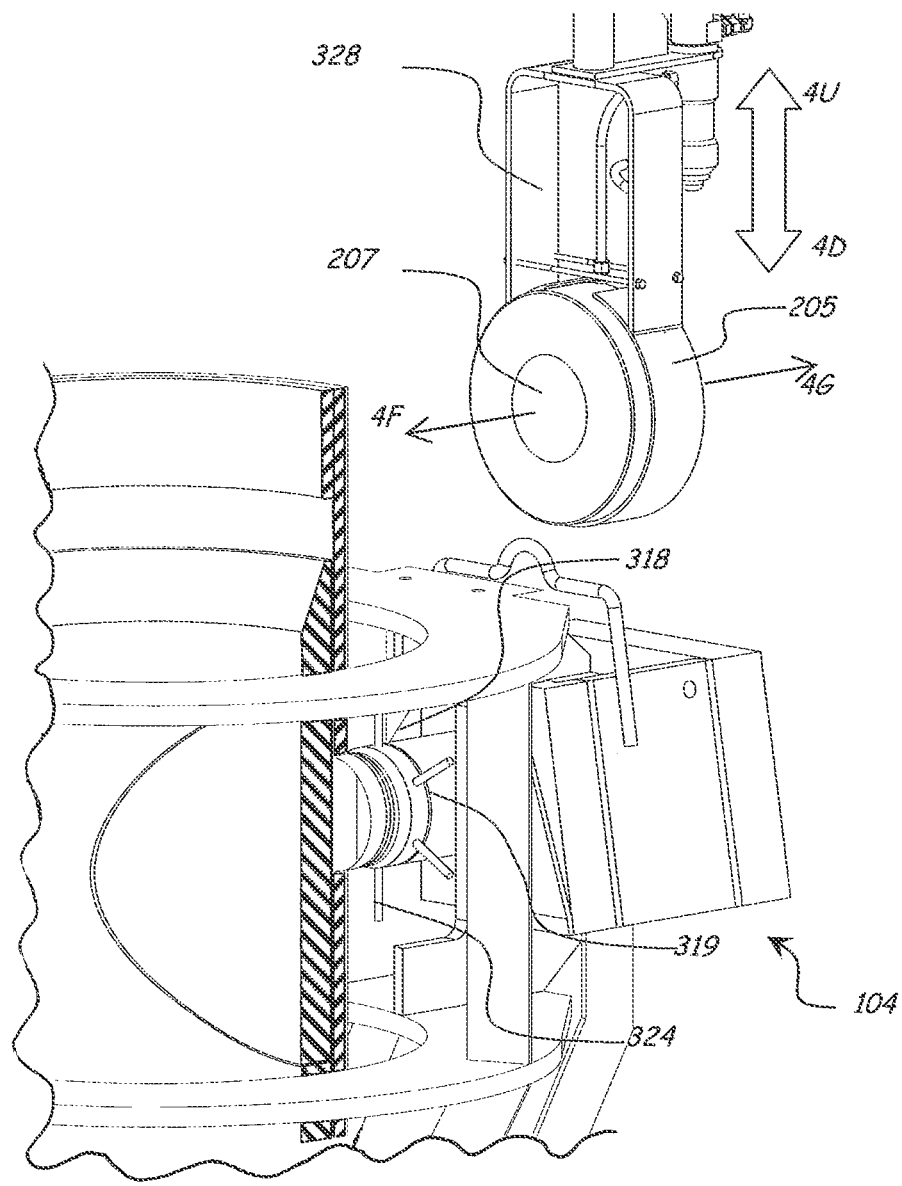
FIG. 4 is an enlarged scrap view of a portion of an alternative embodiment of the clamping arrangement as shown in FIGS. 1 and 2 with a separately removable jack portion of the clamping arrangement shown separated from another portion.

FIGS. 3 and 4 show the components in more detail. Whilst the load is applied to the Thrust Bolt the Extended Threaded Collar (310) is rotated so that the end of the Extended Threaded Collar (310) bears against the Reaction Plate (311) thus once the applied load is removed the Thrust Bolt (213) is unable to return to its original position thereby fixing the clamping load permanently into the system. The rotation of the Extended Threaded Collar (310) may be by use of an ROV manipulator or diver applying vertical or tangential load to the Collar Spokes (324). Access for this operation is provided by window (309) in the Fixed Side Plates (308). Collar spokes (324) are shown as straight bars but may be 'L' shaped or 'U' shaped or have a ring at the end to better assist the ROV to grip and move the spokes.

The clamping arrangement may be located at any position along the Outer Tube (1). (Tubular members (1) and (2) have been shown in the Figures with ends adjacent the clamping arrangement for clarity only. In a practice, each tube may be of different lengths.) The Inner Tube (2) is slidably insertable into the Outer Tube (1) along a common longitudinal axis 2L. The clamping arrangement comprises a frame portion (102) that is mounted to the outer tube. In the embodiments shown the frame portion is provided with substantially annular supports that are arranged to mount around the outer tube, in a plane perpendicular to the longitudinal axis of the tubes.

While reference is made to an inner tubular member (2), the present invention as described with reference to FIGS. 1 to 16 could be used where the inner tubular member was either a solid rod, or a filled tube.

Although the preferred embodiments use members of a circular cross section, the invention may be used with longitudinal members of other cross-sectional shapes, for example, ovoid or rectangular or triangular, as may be required for particular applications.

The clamping arrangement is arranged to provide a clamping force in a direction along a longitudinal axis 2F of the Thrust Bolt (213) that is perpendicular to the longitudinal axis 2L of the tubes so as to resist an axial force along the direction of axis 2L tending to cause relative movement of the tubes along the longitudinal axis.

A fixed portion (102) of the device is preferably permanently attached to the structure. The permanent elements may comprise the Outer Tubular Member (1), a fixed reaction portion being Heavy Grooved Collar (3), Ring Stiffeners (5) encircling the outer tube, so as to resist deformation of the outer tube, a movable clamping portion being Movable Pad (6), Fixed Side Plates (308), Thrust Bolt (213), Extended Threaded Collar (310) and Inner Reaction Plate (311).

In the disclosed embodiments, the fixed portion (102) may be a permanently attached portion (102), or vice versa. The Heavy Grooved Collar is preferably a short tubular section having a relatively thick wall.

A portion or portions or parts (103) of the structure required for jacking are removable from the permanently attached portion (102) of the clamping arrangement. The clamping arrangement is such that a clamping force may be sustained when the removable portion(s) (103) are removed. The permanently attached portion (102) may comprise, for example, a Threaded Collar (310), a wedge element (440), and/or any other ancillary element such as, for example, a wedge spring, tee bar, release pins, and/or guide plates that stay with the structure.

In the disclosed embodiments, the Removable Portion (103) may comprise, for example, the hydraulic system, hot stab, hydraulic lines, gauges, pressure intensifier, hotstab receptacle, associated fittings, valves, and/or hydraulic fluid containers. The Removable Portion (103) may, for example, comprise a jack and spring return features described below.

A benefit of having portions removable from the attached portion of the clamping arrangement is that weight may be removed from the permanent structure and costs are reduced as the removable portion may be re-used in future applications.

Figure 5:
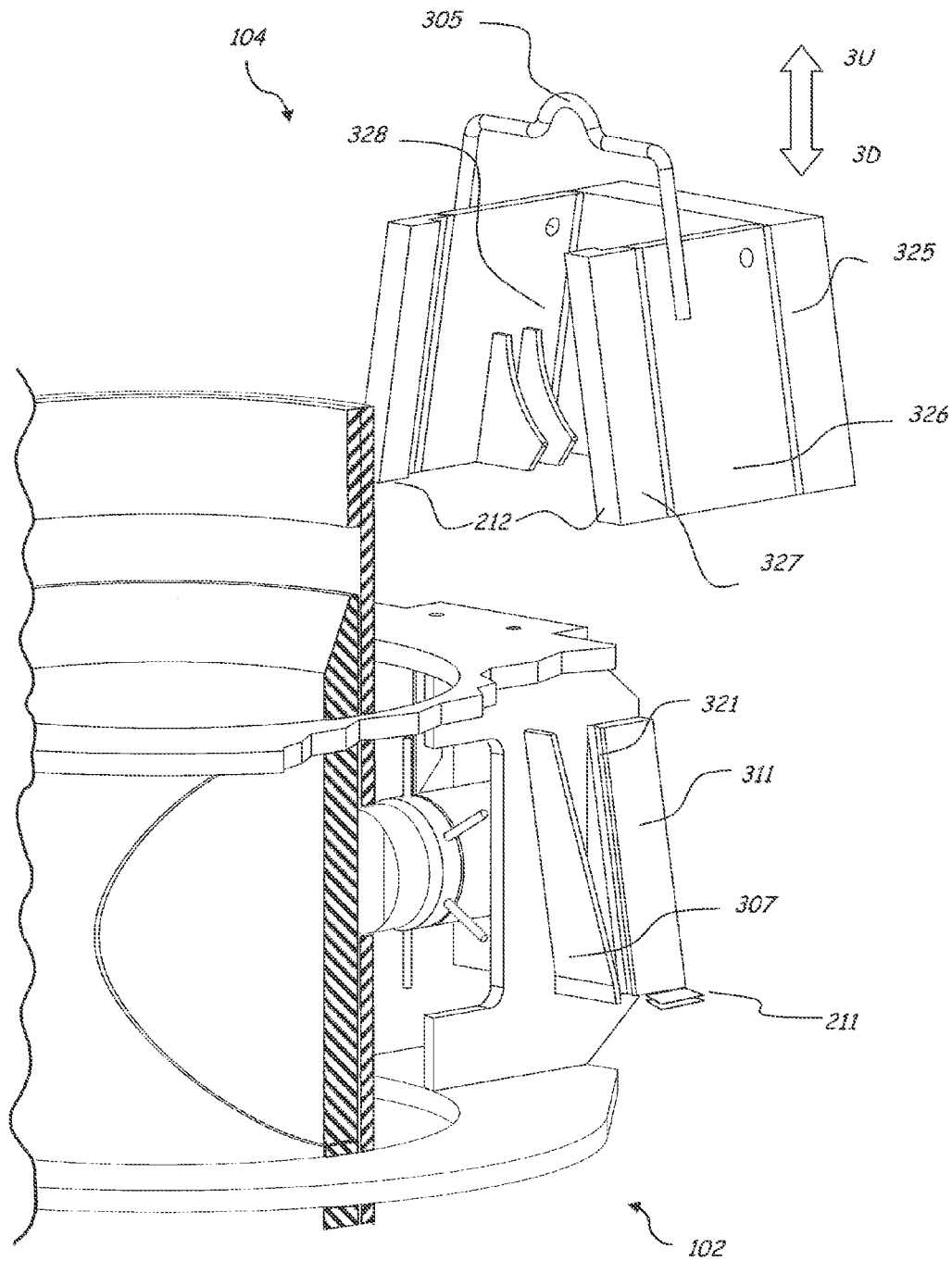
FIG. 5 is an enlarged scrap view of a portion of the clamping arrangement as shown in FIGS. 1 and 2 with only a removable bracket portion of the clamping arrangement shown in a removed position separated from another portion.

The Rear Reaction plate (325) and Wing Plates (326) with Claw Plate (327) comprise Removable Reaction Portion (104) which together with the Jack (205) comprise the Removable Portion (103) which is removable in the direction of arrow 3U. The Rear Reaction Plate (325) and Wing Plates (326) with Claw Plate (327) may be moved whilst attached to the Jack (205) as Removable Portion (103) as shown in FIG. 3 or alternatively may be moved in a separate operation as Removable Reaction Portion (104) as shown in FIG. 5 using a Lift Handle (305). In the embodiment shown in FIG. 5, the Lift Handle (305) is welded to the Wing Plates (326). The Jack (205) may be provided with a Support Bracket (228), so that it may be deployed in the direction of arrow 4D and retrieved in the direction of arrow 4U separately as shown in FIG. 4. In a typical installation, where the direction of arrow 4D is downward, when deployed, the Jack (205) will rest under the influence of gravity on Jack Support Plates (328). The Jack (205) and Support Bracket (228) comprise a Removable Forcing Portion (106). An Open Pocket (107) to receive the Removable Forcing Portion (106) is bounded by Rear Reaction plate (325) and Wing Plates (326) and Jack Support Plates (328) and an End Face (312) (shown in FIG. 6) of Thrust Bolt (213).

In a particular embodiment a Stop (211, shown in FIGS. 3 and 5) is provided at a lower edge of Reaction Plate (311) adjacent to Mateable Rebates (321) to prevent the Mateable Rebates (320) of the Removable Portion (103) moving under the influence of gravity in the direction of arrow 3D such that it requires excessive force to remove in the direction of arrow 3U, while the inner member (2) is hammered into the supporting ground. Stops (211) abut a lower edge (212) of the Claw Plate (327) when the removable portion is fully engaged with the fixed portion.

Figure 6:
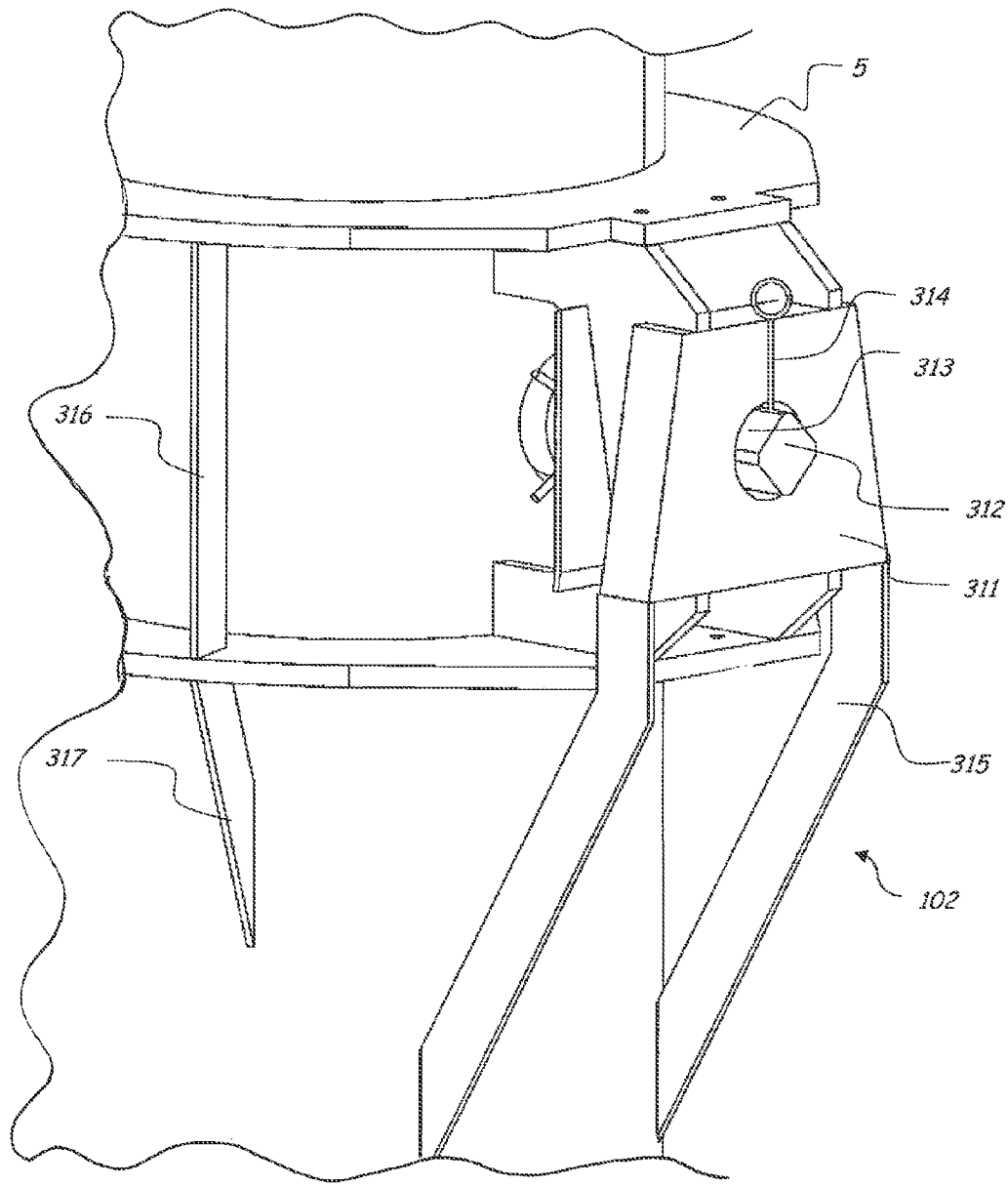
FIG. 6 is an enlarged scrap view of a portion of the clamping arrangement as shown in FIGS. 1 and 2 from a different viewpoint, with removable parts or portions removed from the clamping arrangement.

FIG. 6 shows the device with all removable elements detached.

The Hydraulic Cylinder or Jack (205) is a pressure inducing member, typically in the form of a hydraulic cylinder with a movable concentric piston, and is operated when powered by high pressure hydraulic oil supply. The cylinder may have a circular hole, possible threaded, passing through it, sometimes this is referred to as a Hydraulic Nut The Rear Reaction plate (325) and Wing Plates (326) with Claw Plate (327) are arranged to resist the pressure exerted by the Jack (205), so that the Jack is enabled to act on the Thrust Bolt (213) and , in turn, the Movable Pad (6) so as to fixedly clamp the inner tube within the outer tube.

The sustained clamping force maintained by the permanently attached portions of the clamping arrangement when the removable portion(s) are removed is preferably at least 75% of the actuating force provided by the pressure inducing member when the removable portion is attached to the permanent structure, and the pressure inducing member is powered to operate the clamping action.

In a particular embodiment, it has been found that the above sustained clamping force achieved may be more than 90% of the actuating force.

The maximum actuating force is arranged to be such that deformations of the clamping arrangement and the clamped tube are elastic. The materials for the stressed portions of the clamping arrangement are selected with material properties such that the stressed portions of the clamping arrangement are not subject to relaxation of the stress due to creep.

Hence the sustained clamping force may be maintained or locked indefinitely in the clamping arrangement, ensuring that relative axial movement between the inner tube and the outer tube is prevented. Hence the inner and outer tubes are connected together indefinitely.

An ROV (Remote Operated Vehicle) may be used to move the removable movable self attaching and aligning jacking system. This may be assisted via a Support Framework (302 and 360) attached to the Wing Plates (326) using Support Plate (301) through Bolts (322) to a Buoyancy Unit (303). The Buoyancy unit will thereby reduce the effective submerged weight. To assist handling Grab Handles (304) are attached to Support Framework (302 and 360). The removable portions are removed by moving them away from the permanently attached portion of the clamping arrangement in a direction along axis 2P substantially perpendicular to the clamping axis 2F. In the embodiments shown the axis 2P is substantially parallel to the longitudinal centre axis 2L.

In a typical installation, the axis 2L will be substantially vertical. Hence the axis 2F will be substantially horizontal. Hence in the embodiments shown herein, the axis 2P will also be substantially vertical, and the direction of arrow 3U will be in an upward direction, and arrow 3D will be in a downward direction. In a particular embodiment, the Jack (205) with Push Pad (207) is conveniently powered using hydraulic pressure through Hydraulic Hoses (206) delivering pressure from the ROV via a Hot Stab unit (323). The Jack (205) is held in position under the influence of gravity via either Jack Support Plates (328) or Jack Support Clamp (228) depending on the preferred Jack deployment configuration. When powered using hydraulic pressure via the Hot Stab unit, the Push Pad (207) will be forced in the direction of arrow 4F, causing an equal and opposite reaction to the rear of the cylinder (205) in the direction of arrow 4G. When the Jack Cylinder (205) is mounted in the Pocket (107) the Push Pad will then act on the inner Member (2) through the intermediate members, Thrust Bolt (213) and Movable Pad (6).

Figure 7:
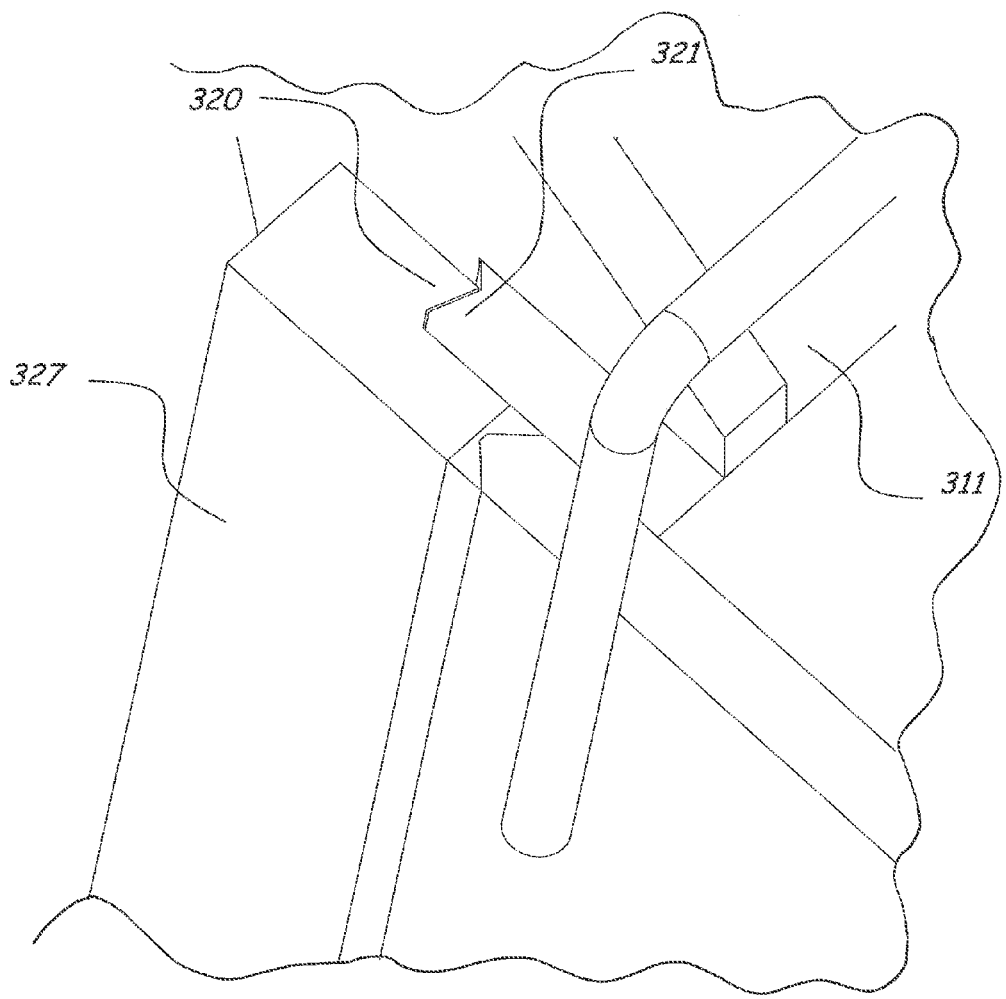
FIG. 7 is an enlarged scrap view of a portion of the clamping arrangement as shown in FIG. 3 viewed from a direction parallel to a longitudinal axis of the tubes, showing the inter-engagable hook portions.

FIG. 7 shows a close up plan view of the Inner Reaction Plate (311) and Claw Plate (327) with mateable rebates (320 and 321) that have contact faces inclined to the axis of the rebate to prevent detachment once engaged. The mateable rebates are a particular embodiment of inter-engagable hook portions. The sides of the Inner Reaction Plates (311) are tapered to allow the movable elements (Rear Reaction Plate, Wing Plates and Claw Plates) to easily mate, self centre and align with the fixed Inner Reaction Plate (311) under its own weight. The alignment is assisted by the Faring Plates (307) that are located on each Fixed Side Plates (308). These plates are inclined and guide the underside of the Claw Plate to engage fully with the Inner Reaction Plate (311). The movable elements may be easily detached and removed by a simple substantially vertical lift operation.

Should the device be located on the outside face of a submerged structure and the structure is located in an area subject to fishing there exists a risk for the fishing gear (wires, warp lines, fishing net, trawlboard etc.) to become snagged against the external profile of the device. To prevent this Deflector Plates (315) may be attached between the underside of the Inner Back Plate (311) and the Outer Tubular (1) and also between the Upper and Lower Ring Stiffeners (5) and between the underside of the Lower Ring Stiffener (5) and the Outer Tubular (1). These are intended to encourage the passage of wires around and over the device thereby avoiding hooking.

FIG. 6 shows the End Face (312) end of the Thrust Bolt (213) projecting through an opening (313) in the Inner Reaction Plate (311). The End Face (312) is shown square but could equally be any uniform cross section. The Retaining Pin (314) holds the Thrust Bolt (213) and attached Movable Pad (6) in position. After insertion of the Inner Tubular (2) into the Grooved Collar (3) the Retaining Pin (314) shall be removed. This will be carried out prior to application of loading to the Thrust Bolt (213).

An Indicator Plate (318) is shown in FIG. 4. This is fixed to the underside of the Upper Ring Stiffener (5) and the tip of the Indicator Plate (318) is located close to the face of the Extended Threaded Collar (310). A Circumferential Marker (319) is provided on the outside face of the Extended Threaded Collar (310) such that when the end of the Extended Threaded Collar (310) is in full contact with the Inner Reaction Plate (311) the tip of the Indicator Plate (318) is aligned with the inside face of the Circumferential Marker (319). This allows the ROV operator to confirm that the Extended Threaded Collar (310) is in positive contact with the Inner Reaction Plate (311) prior to release of the jacking load.

In a further embodiment, a variation of the above is also possible whereby the ROV Hotstab (323) and hydraulic Hoses (306) are mounted on the Rear Reaction Plate (325). This allows the complete movable assembly including Rear Reaction Plate (325), Wing Plates (326), Claw Plates (325), Jack (205), Hotstab (323) and Hydraulic Hoses (306) to be deployed or recovered as a combined unit (see Recoverable Portion 12C, as described with reference to the second embodiment in FIG. 12). This would allow the unit to be deployed with the permanent elements and the structure. Then, following activation of the connection, a simple recovery of the movable assembly to be recovered to the surface may be made using a simple vertical lift, for example by using a vessel crane hook.

In an application such as a leg for a platform, although the leg may be positioned at an angle to the vertical, the moveable assembly may nevertheless be disengaged by the simple vertical lift. By introducing a bar or roller mounted on the outer tubular the lift wire may be directed from substantially vertical to a line of action parallel to the outer tubular thereby assisting removal.

In an application where the longitudinal axis of the clamping arrangement is at more of an angle to the vertical, the moveable assembly may be arranged to disengage in a direction at an acute angle to the longitudinal axis to facilitate removal by the simple vertical lift.

In an alternative embodiment not shown herein, the clamping arrangement is provided with a rotary interface whereby the ROV would engage a rotary tool into a receptacle mounted on the permanent part so as to cause the collar to be rotated rather than apply load directly to the spokes.

In a further alternative embodiment not shown herein, the clamping arrangement is arranged so that a removable jack is inserted with its direction of jacking aligned in a direction substantially parallel to the longitudinal axis of the tubes. Hence, in a typical application mounted to a substantially vertical platform support leg, the jack would have its direction of jacking movement in a substantially vertical alignment rather than the substantially horizontal arrangement shown herein, where the axis of movement of the jack is perpendicular to the longitudinal axis of the tubes. In this further alternative embodiment, the jack would be preferably arranged to operate on an arrangement so as to move a moveable clamping portion, such as moveable pad (6) so as to fix the two tubes together. An example of a suitable arrangement would be where the jack is arranged to drive a wedge, similar to wedge plate (401) between a fixed reaction portion, such as reaction plate (311), and a moveable clamping portion. In such an arrangement, a separate means for maintaining the clamping force, such as collar (310) would not be required, since by introducing two inclined faces or wedge pieces the vertical jack movement would convert into horizontal movement thereby driving the thrust bolt and therefore the movable pad onto the Inner Tube.

In use in a typical deep sea platform construction, the outer tube with an inner tube fitted and with the removable portions of the clamping arrangement attached to the fixed portions, will be positioned at a desired place on the sea bed. The inner tube will then be hammered into the sea bed to a desired depth. The tubes will then be fixed together by operating the clamping arrangement. The removable portions will then be removed for re-use on the next platform to be constructed. At the end of the platform's useful life, the removable portions are re-attached to the fixed portion on the clamping arrangement. The clamping arrangement is then released, and the outer tube and the complete clamping arrangement can be recovered. A guide wire system from a surface vessel may be provided to assist in lowering and aligning the removable portion to the fixed portion.

In a particular embodiment, it has been found that a suitable inside diameter for the outer tubular member is approximately 800 mm and a suitable outside diameter for the inner tubular member is approximately 600 mm, the collar having a thickness of 85 mm. Hence a suitable travel of the moveable pad 6 in the direction of axis 2F is approximately 30 mm to ensure adequate engagement of the circular pad with the surrounding collar. Adequate engagement is necessary to ensure the axial load may be transmitted safely from the inner tube to the outer tube through the moveable pad. Preferably the diameter of the moveable pad is close to the diameter of the inner tubular member, and a suitable value has been found to be 70% to 85% of the inner diameter of the collar, that is, giving a pad diameter of approximately 500 mm. Other suitable values may comprise the same or substantially the same as the outer diameter of the inner tubular member, or any range between 99% and 85% thereof. Such a diameter ensures that an adequate clamping force can be applied to the inner member without causing substantial permanent deformation to the inner member. A suitable diameter for the thrust bolt has been found to be 180 mm, hence a hole in the side of the outer tube is kept to a minimum size, to just give clearance to the thrust bolt, and hence maintaining high integrity and strength of the outer member at the clamping arrangement. The size of hole required in the side of the outer tubular member in this embodiment is less than 25% of the diameter of the member.

In a preferred embodiment, a maximum clamping travel of the moveable pad (6) in the direction of axis 2F with respect to the collar (3) is less than, and more preferably less than half, the thickness of the collar.

In another preferred embodiment, a maximum clamping travel of the moveable pad (6) in the direction of axis 2F with respect to the collar (3) is less than three quarters of the thickness of the collar.

At least one embodiment comprises an underwater clamping arrangement wherein the clamping arrangement comprises a movable pad (6), and wherein a dimension of the movable pad (6) in a plane perpendicular to the longitudinal axis (2L) is substantially the same as an outer diameter of the second member (2).

Where the pad is of a substantially circular shape to fit within a round hole in the side of the collar, the dimension is the diameter of the pad, or where the pad is another shape, such as rectangular or square, the dimension is a width across the pad or hole in the side of the collar.

Such dimensions may allow a single pressure inducing element (6) to be used without causing excessive deformation of the inner tube (1). This is beneficial as it reduces the amount of time needed to engage the connection. It minimizes the amount of movable parts and possible failure modes by requiring a single jack and associated hydraulic lines.

A benefit of at least one embodiment the present invention is that the pile or Inner Tube (2) may be driven to any depth before the clamping operation or connection is carried out. This is important as the pile may refuse at some point (i.e. the soil penetration resistance exceeds the capacity of the hammer). A disadvantage of alternative known systems where there is a feature on the Inner Tube (2) that engages with a feature on the Outer Tube (1) is that if such a refusal occurs the connection cannot be made. With the system as described herein there is nothing to prevent connection with the Inner Tube whilst located at any axial location within the Outer Tube. It should also be noted that it is commonly considered that 200 m water depth is the maximum operational depth for divers, hence for connections made below 200 m an ROV operation or remote hydraulically operated tooling such as that described herein is the only realistic option. With this being the case the ability to carry out a simple ROV based operation quickly is advantageous. The simplicity and speed of the operation is important as there is a very high cost associated with hiring vessels that have to be on station over the structure whilst the ROV operation is taking place.

Since in most applications it will be desirable to be able to release the clamping arrangement, for example to facilitate dismantling of the structure, in a deep sea piled structure, this will preferably involve recovery of the structure complete with outer tube or tubes while leaving behind the inner tube or tubes, which will typically comprise a pile or piles driven into the sea bed. Hence, the clamping arrangement of the present invention preferably is arranged so that the clamp may be released at some point in the future allowing the removable portions of the structure to be recovered. For this reason the collar and thrust bolt are preferably manufactured from a corrosion resistant material or have a corrosion resistant coating to assist this.

Further, interconnection interfaces between removable portions of the clamping arrangement and the attached portions are preferably arranged so as to remain free from accumulated debris or other matter from the sea or the sea bed. Hence, the interconnection interfaces on the attached frame portion of the clamping arrangement are preferably arranged as externally facing surfaces, and where this is not possible as open ended channel sections.

Our co-pending patent application PCT/GB2008/002936 describes an embodiment utilising permanent elements with a removable or movable jack and included an embodiment that utilized a threaded collar to retain the load in the connector. The embodiment described with reference to FIGS. 1 to 7 is provided with both the jack and also the Reaction Plate and Side Plates as movable elements. The embodiment described with reference to FIGS. 8 to 16 is an alternative embodiment that uses a Wedge Plate passing through a Slotted Thrust Bolt to lock the load in the connector rather than a threaded collar.

Figure 8:
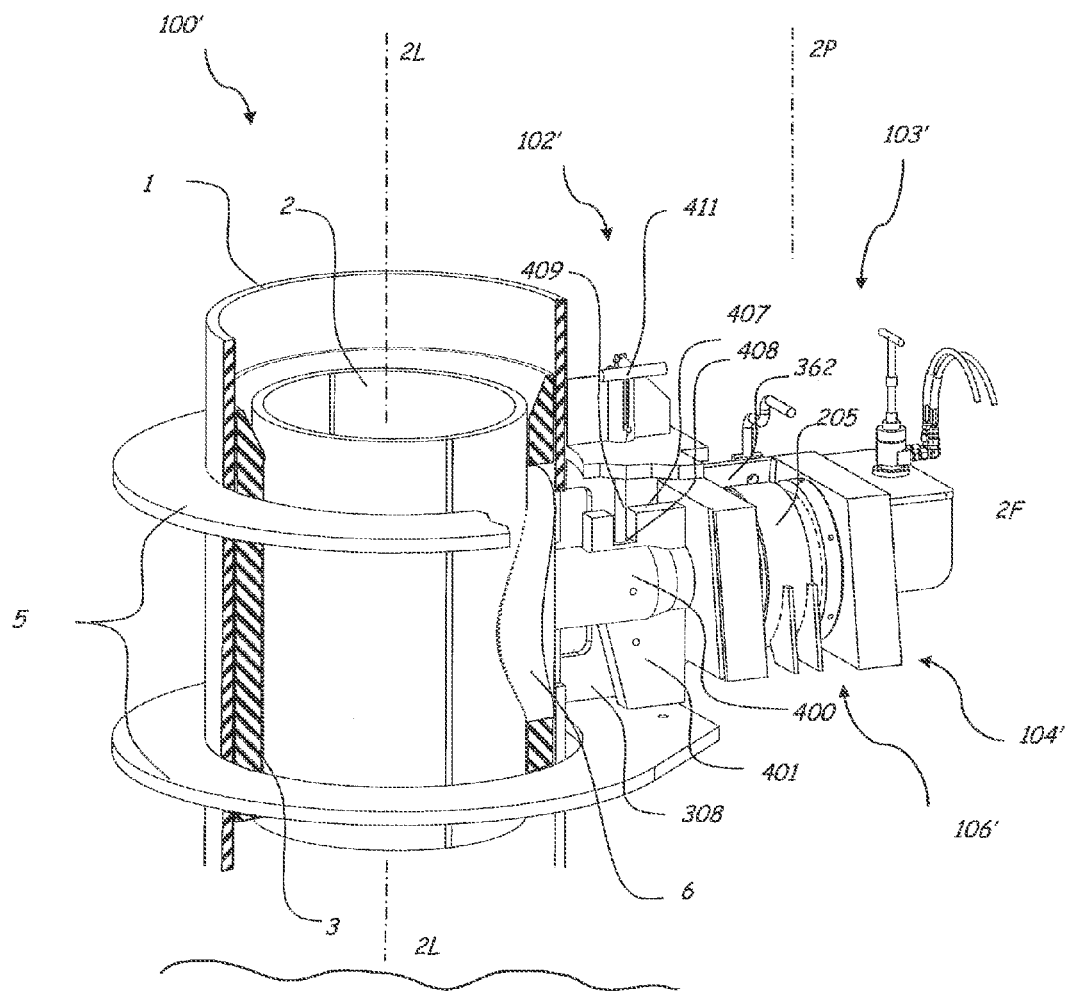
FIG. 8 is a partially sectioned perspective view of a second embodiment according to the invention of a clamping arrangement for fixing two tubular members together having an alternative locking arrangement to retain the clamping arrangement in a clamped state.
Figure 9:
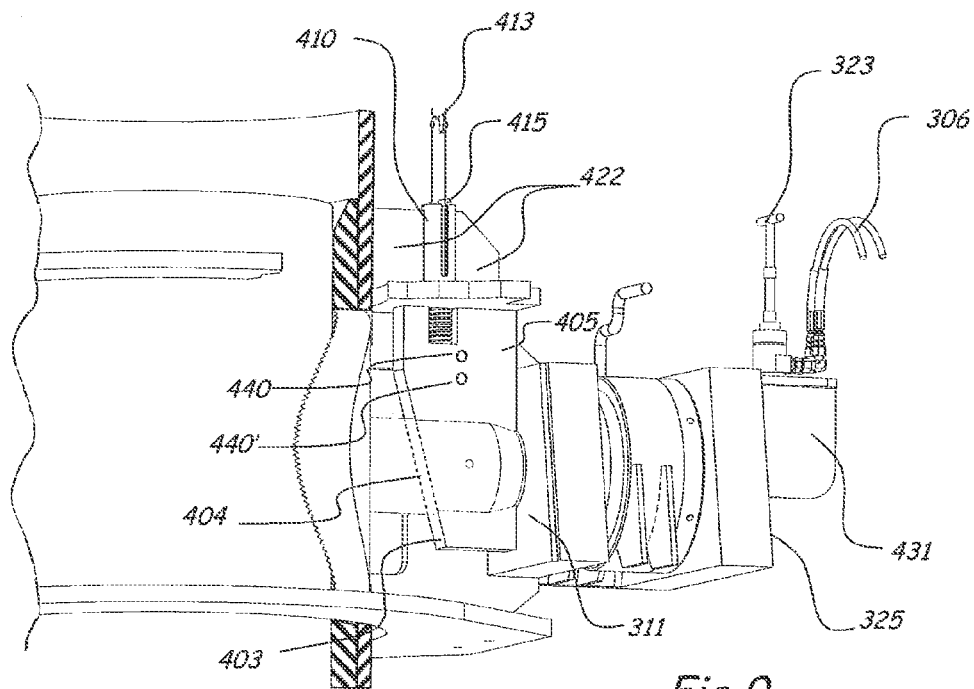
FIG. 9 is a partially sectioned scrap perspective view of the embodiment shown in FIG. 8 with the clamping arrangement shown in an un-clamped state.
Figure 10:
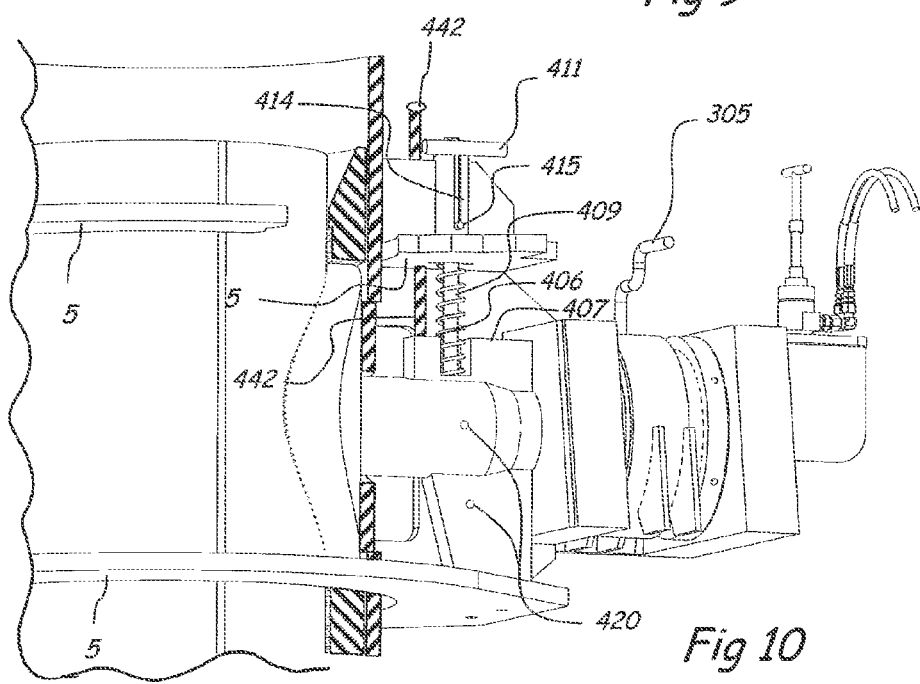
FIG. 10 is the same partially sectioned scrap perspective view of the embodiment shown in FIG. 9, but with the clamping arrangement in a clamped state.

FIG. 8 shows the general arrangement with the near side Wing Plates (326) and Fixed Side Plate (308) removed to provide a clear view of the Wedge Plate (401) and Slotted Thrust Bolt (400). The view shows the Inner Tube (2) inserted into the Outer Tube (1). As with the first embodiment above the Movable Pad (6) is urged or driven towards the Inner Tube (2) by application of a clamping force load in the direction of arrow 13E from a Hydraulic Cylinder (205) through a Slotted Thrust Bolt (400). This force deforms the Inner Tube(2) elastically against the Grooved Collar (3) creating a high frictional force and developing a clamping action thereby preventing relative axial movement along axis 2L between Outer Tube (1) and Inner Tube (2).

Figure 11:
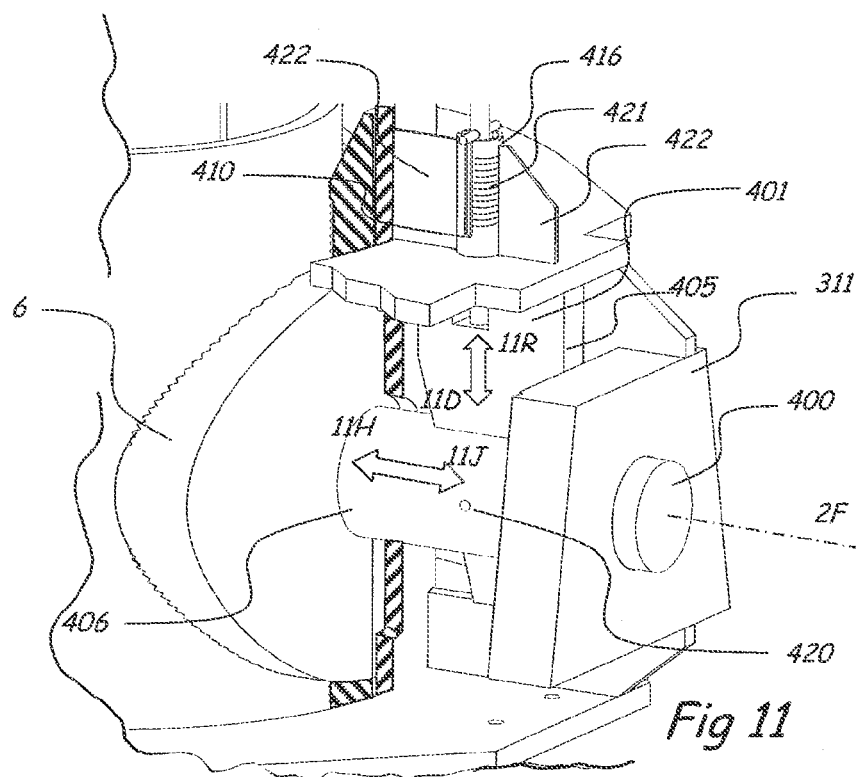
FIG. 11 is a partially sectioned scrap perspective view of the embodiment shown in FIG. 8 with the clamping arrangement shown in an un-clamped state and without a removable forcing means.
Figure 12:
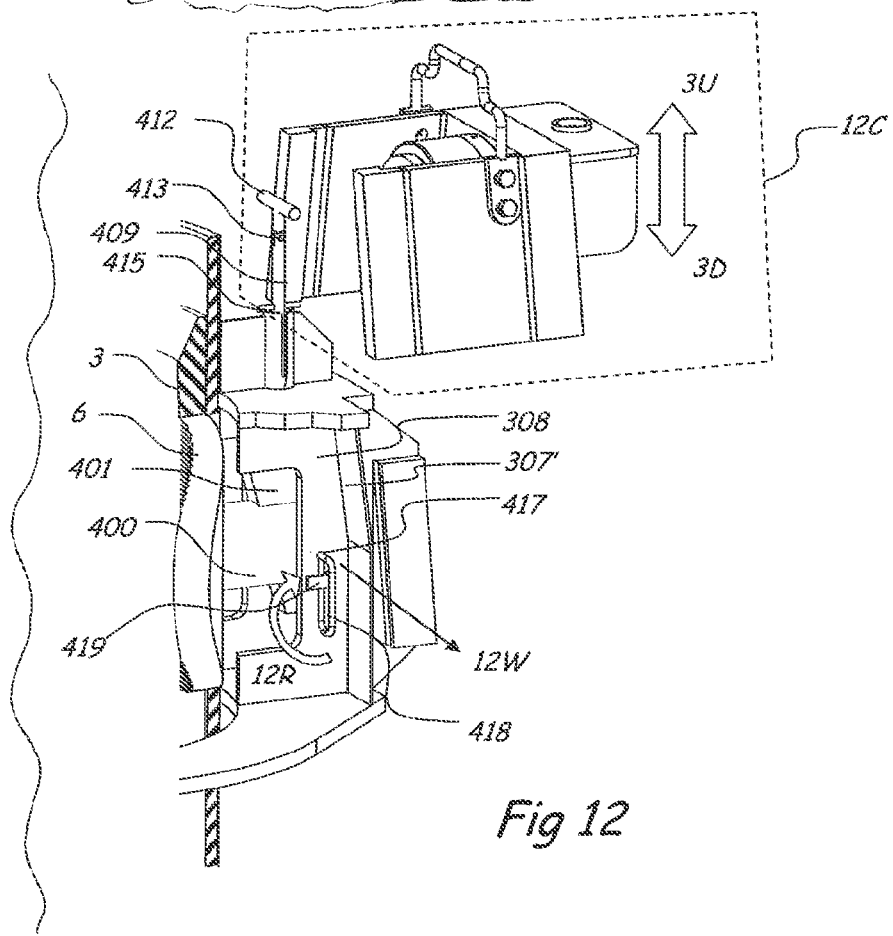
FIG. 12 is a partially sectioned scrap perspective view of the embodiment shown in FIG. 8 with the clamping arrangement shown in an un-clamped state and with a removable forcing means positioned above a fixed portion of the clamping arrangement.
Figure 13:
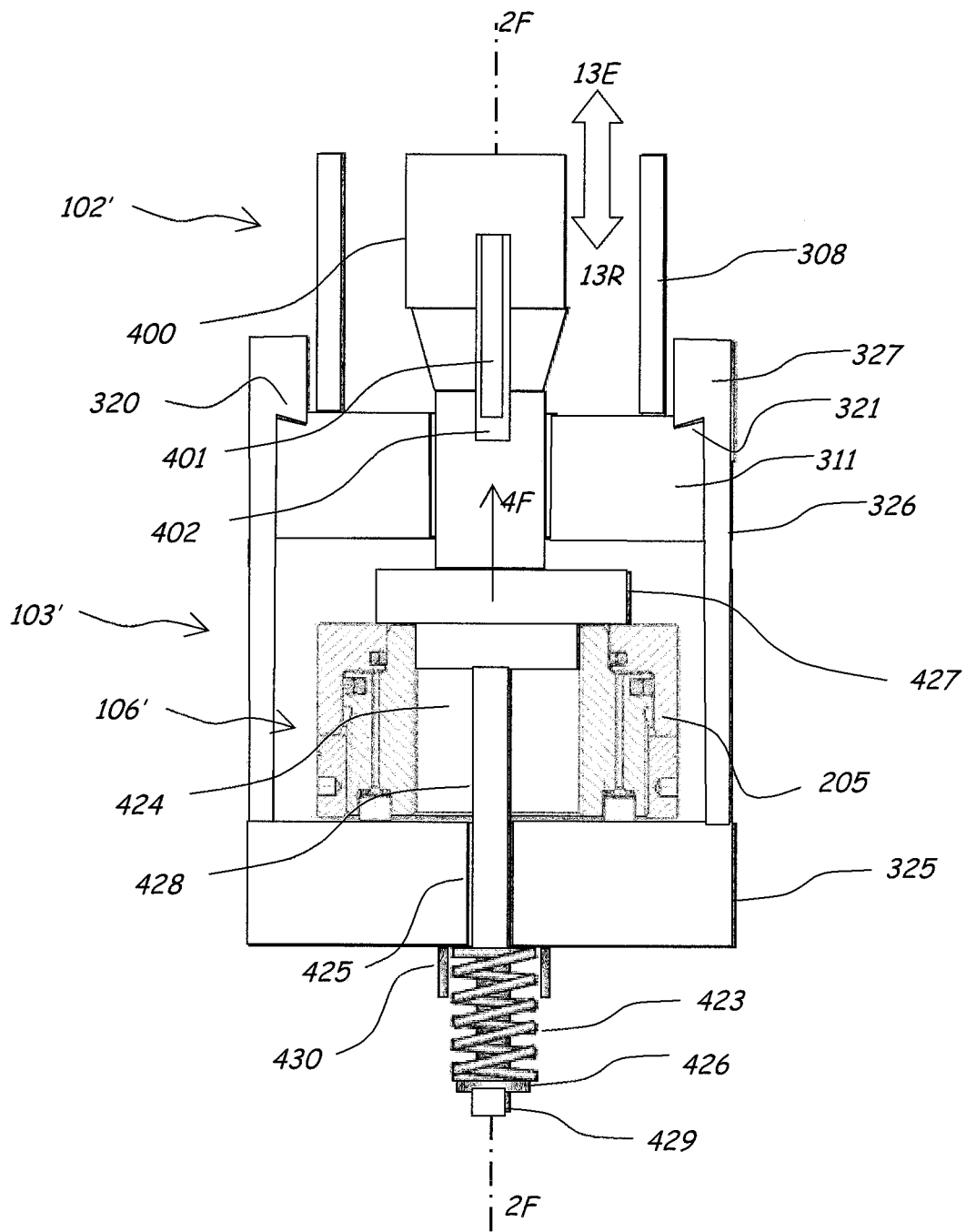
FIG. 13 is partially sectioned diagrammatic scrap plan view of the embodiment shown in FIG. 8, showing a removable forcing portion engaged with permanently attached portions of the structure, the forcing portion being shown in a relaxed position so that the clamping arrangement is in an un-clamped state.

FIGS. 9 to 12 show the components in more detail and along with sectional plan view FIG. 13 shows a method by which clamping force load in the Slotted Thrust Bolt (400) is maintained permanently in the connector. Whilst the initial load is applied to the Slotted Thrust Bolt(400) in the direction of arrow 11H, for example by an hydraulic cylinder, a Wedge Plate (401) is driven into the Tapered Slot (402) so that the front face (403) of the Wedge Plate (401) bears against the front face of the slot (404) and the back face (405) of the Wedge Plate (401) bears against the fixed reaction portion, Reaction Plate (311) thus once the initial applied load from the Hydraulic Cylinder (205) is removed the Slotted Thrust Bolt (400) is unable to return in the direction of arrow 11J to its original position thereby fixing the clamping load indefinitely into the system. The Wedge Plate (401) will fall down naturally by gravity or may alternatively be resiliently urged down in the direction of arrow 11D by use of a pre-compressed Wedge Spring (406) extending between the top surface (407) of the Wedge Plate (401) or Wedge Plate Notch (408) against the underside of a Ring Stiffener (5). The Wedge Spring (406) is guided and retained by an extended Tee Bar (409) attached via a threaded connection or similar into the near surface (407) of the Wedge Plate (401) or Wedge Plate Notch (408) and passing through the Ring Stiffener (5) and then via an External Tube (410) to a Hinged Tee Section (411) or alternative shaped Grab Handle (not shown) that allows a Remote Operated Vehicle (ROV) or diver to lift or lower the Wedge Plate (401).

The Hinge (413) allows the Hinged Tee Section (411) to fold over thereby making the detail less susceptible to being hooked by a hose or wire. It should be remembered that the load required to lift the wedge once the connector in fully loaded is very substantial such that any heavy load applied to the Tee Handle (412) would shear through the Hinge (413) pin rather than move the Wedge Plate (401). The Tube (410) has a longitudinal slot (414) either side to guide a Cross Pin (415) mounted transversely through the Tee Bar (409). The end of the Tube (410) has notches (416) to receive the Cross Pin (415) such that when the Wedge Plate (401) is fully retracted and the Tee Bar (409) rotated through a quarter turn the Spring (406) will hold the Cross Pin (415) into the Notches (416) thereby locking the Wedge Plate (401) in the retracted position. This will be of use should it be necessary to keep the Wedge Plate (401) in the retracted position during a connector release operation.

To ensure that the Wedge Plate (401) does not unintentionally move upwards and release the Clamping Force, a Securing Means may be provided to prevent this happening. A suitable securing means in one embodiment would be the reinsertion of the Retaining Pin 417 through an Upper Hole 440 or 440' (shown only in FIG. 9), or alternatively a Security Screw 442 (shown only in FIG. 10).

Hence underwater clamping arrangement (100') is arranged for fixing at least the first tubular member (1) and the second member (2) together, to prevent relative movement between the members along at least a longitudinal axis (2L). Fixed portion (102') is attached to the first member (1). Reaction portion (104') is attachable to the fixed portion with forcing portion (106'), the forcing portion arranged to apply a clamping force (4F, 4G) in a direction along a forcing axis (2F) substantially perpendicular to the longitudinal axis (2L). The clamping force (4G, 4F) between the reaction portion and the second member acts so as to fix the two members together. The reaction portion (104') and forcing portion (106') are removable portion (103'), removable from the fixed portion when the clamping arrangement is clamped.

The underwater clamping arrangement (100') is arranged so that the removable portion is arranged to engage slidably with the fixed portion, by moving under the influence of gravity in the direction of arrow 3D as shown in FIG. 12. As the removable portion engages the fixed portion, Faring Plates 307' which are located on each of the Fixed Side Plates (308) slidably guide and align the removable portion with the fixed portion. The tapered outwardly facing hook portion on the rear reaction plate (311) slidably engage the abutting faces of the inwardly facing hook portion on the sloping sides of Wing Plates (326) and Claw Plates (327) of the removable portion. Hence to fit the removable portion, it is lowered under the effect of gravity onto the fixed portion until fully engaged. Full engagement may be confirmed by verifying that the top edges of the hook portions (320, 321) are substantially level with each other.

In use, when hydraulic pressure is supplied to the jack, the hook portions (320, 321) are arranged to ensure secure engagement.

FIG. 12 also shows a Retaining Pin (417) with a shaped Pin Handle (418) and Retaining Pin Clip (419). The Retaining Pin (417) passes through both Wing Plates (308) and both the Slotted Thrust Bolt (400) and Wedge plate (401). This ensures that whilst the Retaining Pin (417) is inserted in the Retaining Pin Hole (420) the Movable Pad (6) is maintained in an unclamped position with respect to the Grooved Collar (3) and as such will not encroach into the void through which the Inner Tube (2) must initially pass. For security, the Retaining Pin Clip (419) holds the Retaining Pin (417) in position such that the Pin Handle (418) must be rotated in the direction of 12R before being withdrawn from the Retaining Pin Hole (420) in the direction of 12W.

FIG. 11 also shows the Graduated Marks (421) on the Tube (410). This will give a visual indication of the amount of vertical travel in the direction of arrow 11D of the Wedge Plate (401) and thereby a secondary indication of the amount of longitudinal movement of the Slotted Thrust Pin (400) in the direction of arrow 11H and therefore Movable Pad (6). Should the device be located on the outside face of a submerged structure and the structure is located in an area subject to fishing there exists a risk for the fishing gear (wires, warp lines, fishing net, trawlboard etc.) to become snagged against the Tee Bar (409). To prevent this Deflector Plates (422) may be attached either side of the Tube (410). These plates are intended to encourage the passage of wires or ROV tethers or umbilical connection around and over the device thereby avoiding hooking.

Figure 14:
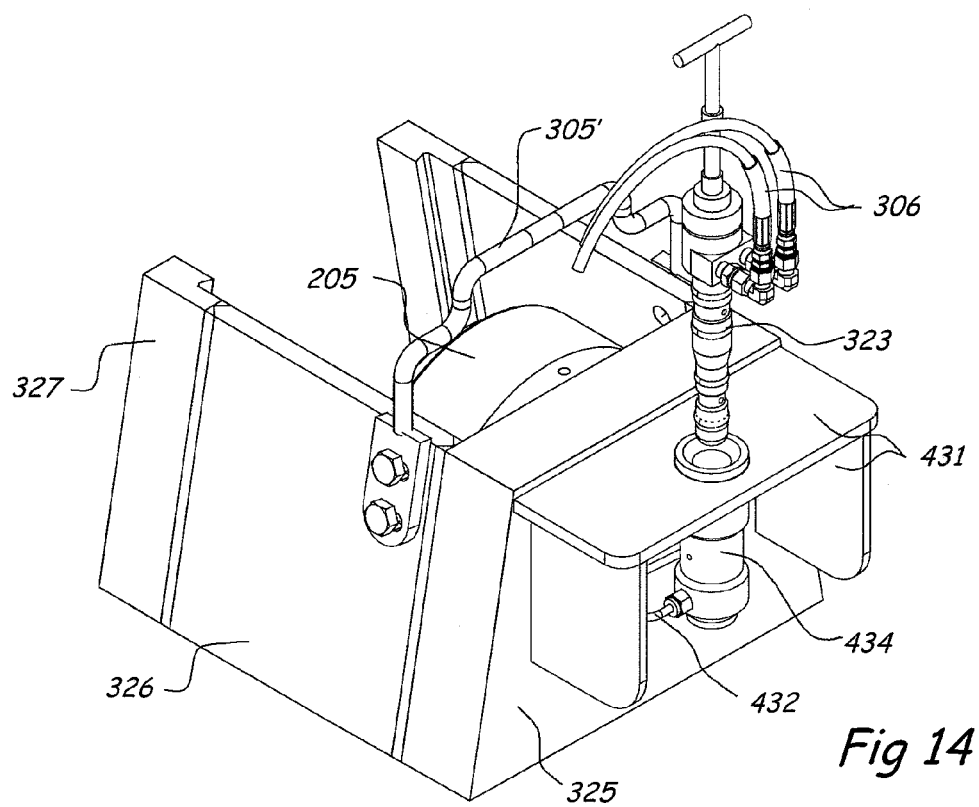
FIG. 14 is perspective view from the rear and above of an embodiment of a removable portion for use with the first or second embodiments of the invention.

FIG. 14 shows a rear view of the arrangement. In this embodiment the ROV Hotstab (323) and hydraulic Hoses (306) are mounted on the Rear Reaction Plate (325) with a Protection Plate arrangement (431). This ensures the both Hotstab (323) and associated Hydraulic Piping (432) from Hotstab (323) to Hydraulic Cylinder (205) are not damaged by either ROV impact or collision by fishing gear or by impact during removal and or deployment of the complete movable clamp assembly. The complete movable clamp assembly is shown detached in FIG. 12 and consists of Rear Reaction Plate (325), Wing Plates (326), Claw Plates (325), Jack or Hydraulic Cylinder (205). It should be noted that the Hotstab (323) and Hydraulic Hoses (306) may not, in this arrangement, be part of the movable assembly as these items may be deployed and recovered separately by the ROV.

Figure 15:
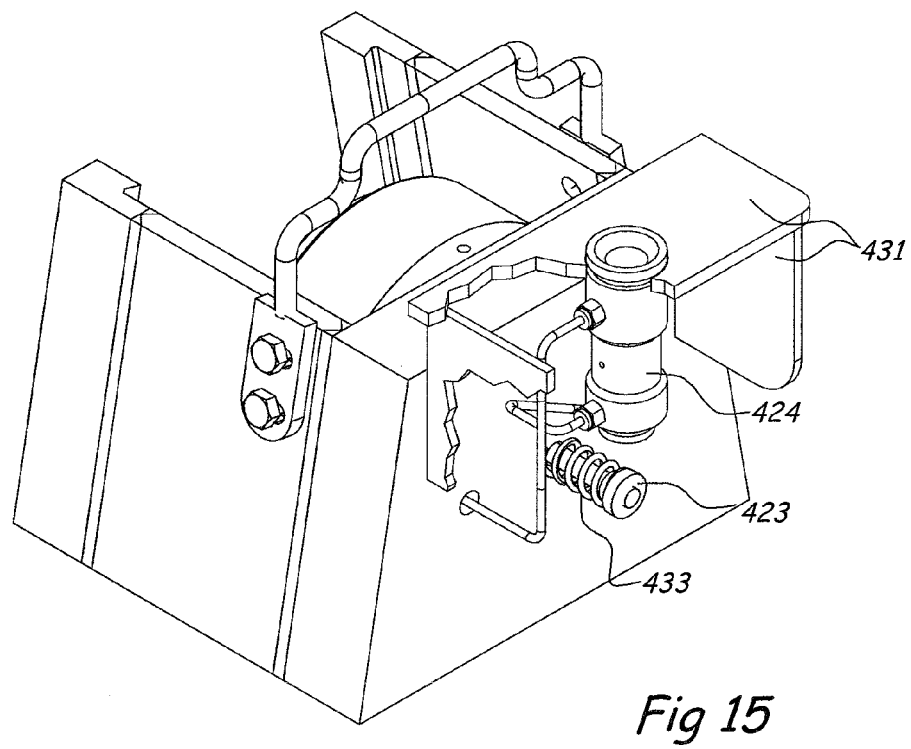
FIG. 15 is a partly sectioned perspective view from the rear and above and with some support elements shown cut-away to more clearly show a spring return means for the hydraulic cylinder of a further embodiment of a removable portion for use with the first or second embodiments of the invention.
Figure 16:
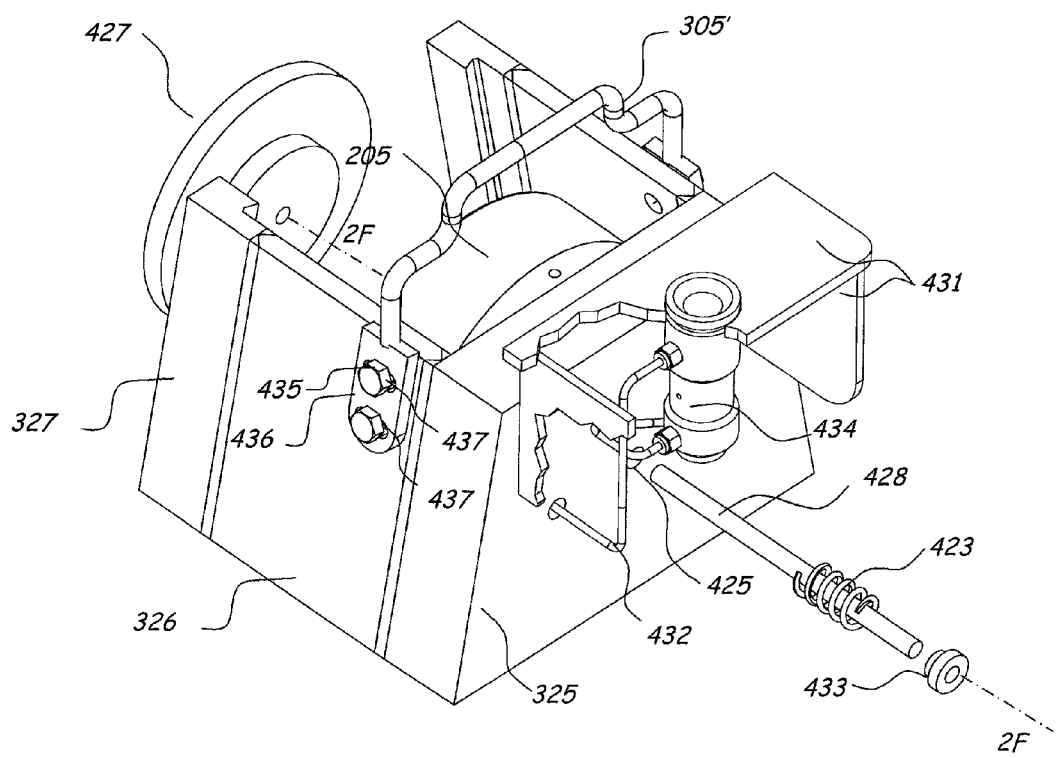
FIG. 16 is a partly sectioned partially exploded perspective view from the rear and above of the further embodiment of a removable portion shown in FIG. 15.

A further embodiment is shown in a sectional view FIGS. 13, 15 and 16 in which a spring return function has been added to retract the Hydraulic Cylinder (205) following loading.

FIG. 16 shows the exploded view of an embodiment of the spring return facility. Part of the Protection Plates (431) is shown removed to allow a clearer view of the Hydraulic Piping (432). The function of the Return Spring (423) is to return the Hydraulic Cylinder (205) in the direction of arrow 13R to its original length once hydraulic pressure is released. In this arrangement the Hydraulic Cylinder (205) has a large diameter Central Hole (424) through the middle. This type of cylinder is well known and is often used in this form as a Hydraulic Nut. A small diameter Hole (425) runs through the Reaction Plate (325) aligning with the axis of the Hydraulic Cylinder (205) and a Return Spring (423) is centred over the Hole (425) with a Spring Retaining Plate (426) at the end of Return Spring(423).

A stepped Packer Plate (427) is placed between the Slotted Thrust Bolt (400) and the front of the Hydraulic Cylinder (205) and a Central Bar (428) with threaded ends is attached to the Packer Plate (427) and runs through the large diameter Central Hole (424) and Hole (425) extending through the Spring (423) and the Spring Retaining Plate (426) to a Retaining Nut (429). The Spring Retaining Plate (426) to a Retaining Nut (429) may be substituted with a Threaded Stepped Retaining Plate (433) that combines both functions as shown in FIGS. 15 and 16. By adjusting the Retaining Nut (429) the compression in the Return Spring (423) may be increased or reduced. The Spring is kept in position by a Spring Retaining Tube (430) attached to the Reaction Plate.

Embodiments of the underwater clamping arrangement may comprise the hydraulically operated cylinder (205) having an opening through the body of the cylinder allowing passage of a bar (428). The bar (428) is attached at one end to a retaining plate (427) whereas the other end projects through the back plate (325). The projecting part of the bar (428) passes through a helical compression spring (423). Compression is maintained in the spring using a nut (433). Thus, by applying pressure within the cylinder the retaining plate (427) is moved forward thereby further compressing spring (423) such that when the hydraulic pressure is released the spring (423) pushes the retaining plate back to its starting position. In this way the removable portion (103) is able to be removed from the assembly freely.

The Spring (423) provides some resistance to the clamping force load delivered from the Hydraulic Cylinder (205) to the Slotted Thrust Bolt (400) but this resistance is small comparative to the load from the Hydraulic Cylinder (205). Once the Wedge Plate (401) has been moved fully in the direction of arrow 11D so that it will prevent any loss of load in the Slotted Thrust Bolt (400), the hydraulic pressure can be released in the Hydraulic Cylinder (205) system, and then the Spring (423) will help to retract the position of the Hydraulic Cylinder (205) making an easier and quicker to release the clamp system and recovery of the complete movable assembly to the surface vessel using Lifting Bar (305'). The Lifting Bar (305') has a Fixing Plate (436) at each end through which Bolts (435) are passed to secure to the Wing Plates (326). The Fixing Plate (436) has a pair of Horizontal Slots (437) to allow adjustment of the Lifting Bar (305') so as the apex of the Lifting Bar (305') is above the centre of gravity of the Removable Clamp Assembly shown in FIG. 12.

To release the connector, so as to separate the inner and outer tubes or to adjust the relative axial position of the inner and outer tubes the sustained force or load within clamping arrangement is arranged to be releasable.

When it is desired to release the connector, the removable portion is replaced on the permanently attached portion of the clamping arrangement by moving it in the direction of arrow 3D. The Hydraulic Cylinder Jack (205) is then supplied with high pressure hydraulic oil using a suitable power source, such as an ROV equipped with a hydraulic Hot Stab to urge a piston portion of the Hydraulic Cylinder to move in the direction of arrow 13E.

In the case of the first embodiment, the hydraulic pressure is controlled to be sufficient to enable the pressure sustaining means, Threaded Collar (310) to be moved back to an initial position by rotating about the screw thread so as to allow the Thrust Bolt (213) to move in an unclamping direction, that is in a perpendicular direction away from the axial centre line of the inner and outer tubes.

In the case of the second embodiment, the hydraulic pressure is controlled to be sufficient to enable the pressure sustaining means, Wedge (401) to be moved back to an initial position so as to allow the Slotted Thrust Bolt (400) to move in an unclamping direction.

The sufficient pressure to release the pressure sustaining means may need to be greater than the pressure originally used to set the clamping arrangement in the clamped state.

In the second embodiment, to prevent the Wedge falling under the effect of gravity, or if resiliently urged under the effect of the spring, retention means being Cross Pin (415) and Notches (416) are provided to lock the Wedge Plate in the retracted position, when moved fully in the direction of arrow 11R. Hence the clamping arrangement may be maintained in an unclamped state with the Thrust Bolt (400) moved fully in the direction of arrow 11J and the Hydraulic Cylinder in the position shown in FIG. 13 where it is moved fully in the direction of arrow 13R.

When it is desired to actually allow relative movement between the inner and outer tubes, the hydraulic pressure in the Hydraulic Cylinder Jack (205) is released allowing the clamping arrangement to relax back to the original initial unclamped state.

The removable portion(s) (12C) of the clamping arrangement may then be removed for use elsewhere on another similar connector.

Alternatively, if the clamping arrangement was only released to allow for relative axial repositioning of the inner and outer tubes then the removable portion can be used to reapply the clamping force so that the two tubes are again connected to each other.

It should be noted that should the Connection be required at a location within the subsea structure that is inaccessible to ROV's the Hot stab may be located remotely from the clamping arrangement on the outside of the structure in a convenient location with hydraulic tubing connecting the Hotstab to the Hydraulic Cylinder. Similarly the Retaining pin 418 may be removed using a wire attached to the end of retaining pin and extending to a convenient location, accessible to ROV or diver.

Figure 17:
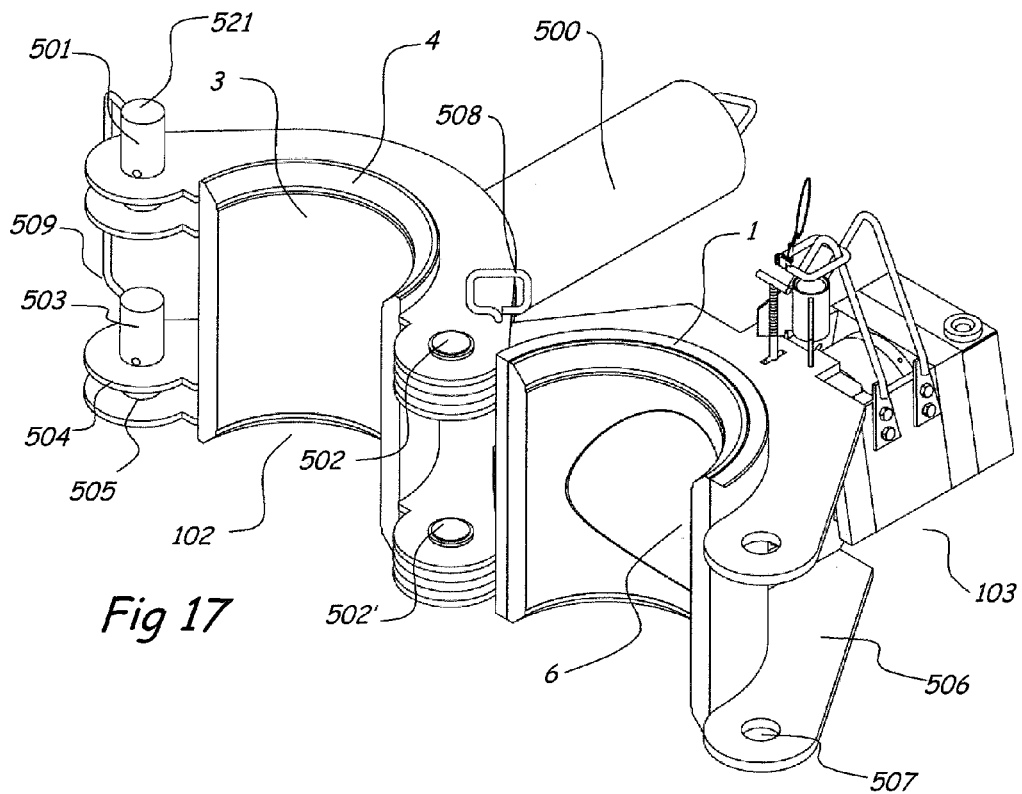
FIG. 17 is a perspective view from above of an embodiment of the outer tubular in the form of a two part hinged clamp orientated in the near vertical, with the clamp set in an open position ready to receive an inner tube.

FIG. 17 shows an embodiment wherein the permanently attached portion (102) and the removable portion(s) (103) may be arranged in the form of a vertical or near vertically orientated clamp. The clamp is shown in an open position with the outer tubular formed in two parts, for example half shells, that has the fixed and removable portions mounted on the rotatable half part. The two parts may comprise all or only parts of the outer tubular (1). For example, one part (4) may comprise part of the collar (3) and not the outer tubular (1), and the other part may comprise part of the collar (3) and the outer tubular (1). Preferably such other part is the part comprising the movable pad (6). The rotation may be about two fixed pins (502 and 502') fixed within close fitting holes within multiple external ring stiffeners (504 and 507) such that when rotated about the fixed pins (502 and 502') the holes (507 and 505) align allowing movable pins (518 and 519) to be lowered through the holes (507 and 505) thereby securing the two half shells around an inner tubular (2).

One embodiment, not shown, is provided with spring-loaded pins with an inclined facet at one end such that when the movable shell is pushed against the pin end facet the pin will rise compressing the spring and only when the holes (505 and 507) align the pin will drop and fully engage the half shells.

Hence in this latching arrangement the retractable pins (518 and 519) are resiliently urged so as to enable the two parts of the shell to latch together when hingedly closed around a member or tube (2). The position of linking bar pin handle (509) enables easy visual confirmation that the pins are fully engaged before a load is applied to the clamp.

Once the two half shells are closed and the pins engaged then the loading of the clamp using the removable portion(s) (103) may commence as describe previously.

Figure 18:
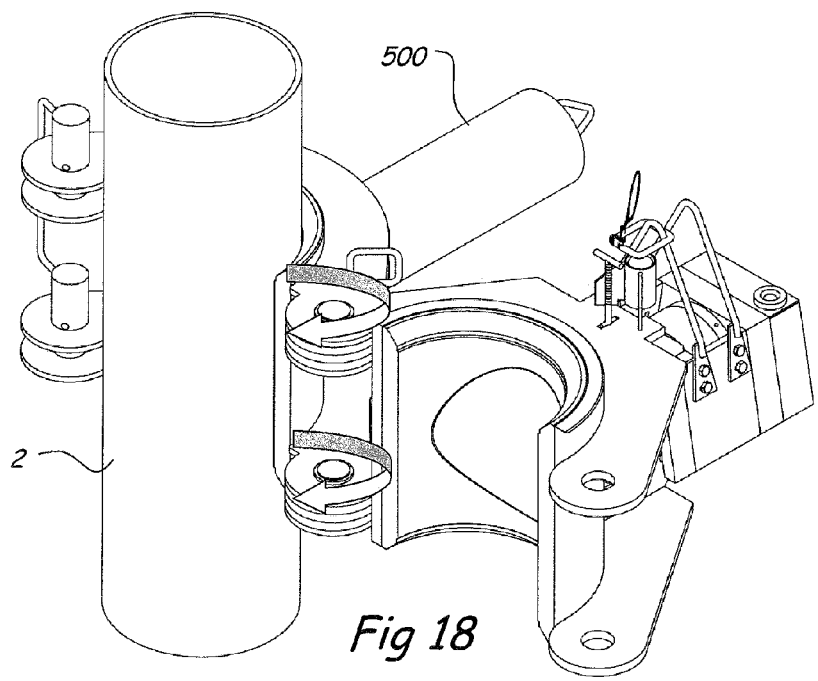
FIG. 18 is a similar perspective view as FIG. 17 but with the inner tube placed in one half of the clamp.

An embodiment illustrated by FIG. 18 may be the same perspective view as FIG. 17 but with the inner tube (2) place in one half of the clamp. The inner tube may be placed in either half of the hinged clamp prior to closure of the clamp.

Figure 19:
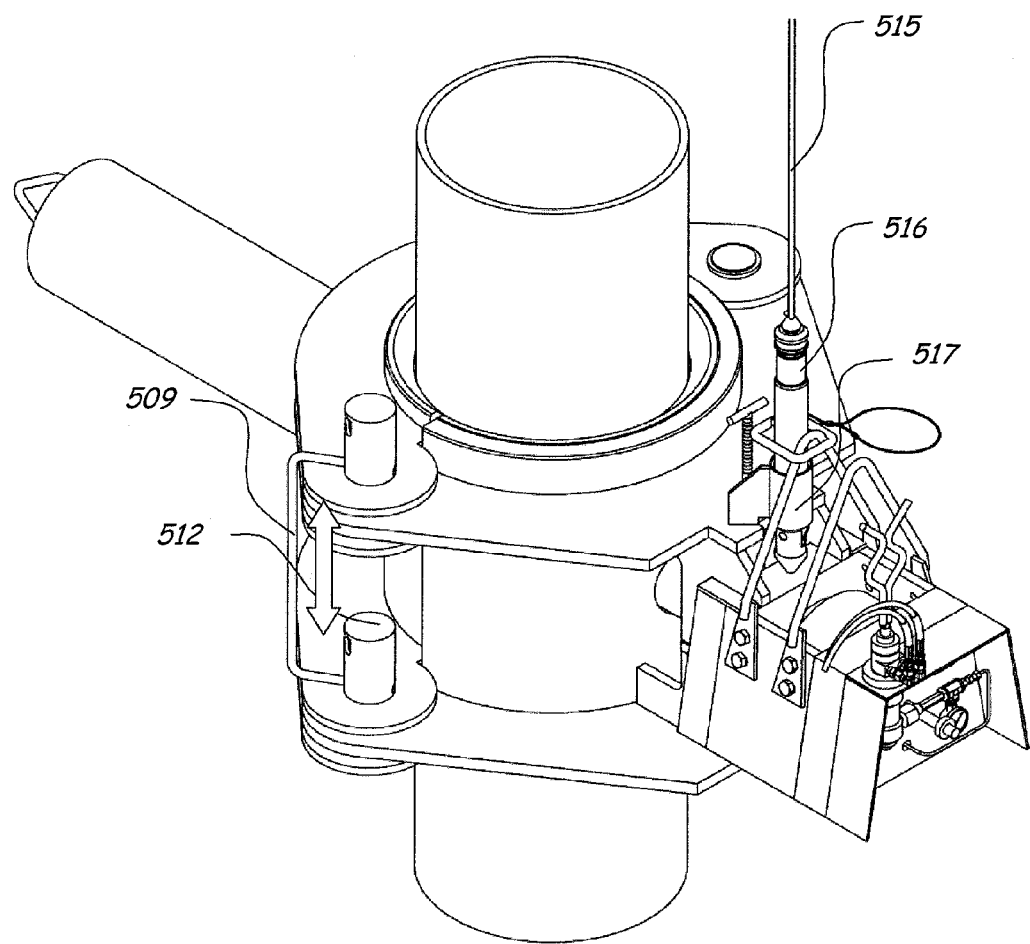
FIG. 19 is a rotated view with respect to FIGS. 17 and 18 and show the clamp closed over the inner tube.

An embodiment illustrated by FIG. 19 shows the clamp shells closed and the movable pins (518 and 519) engaged with the pin handle (509) in the downward position. This embodiment also shows a guide comprising the guide wire (515) attached to the guide wire anchor (516) engaged in turn within the guide anchor receptacle (517), the guide anchor receptacle being attached to the permanently attached portion and hence part of the fixed portion. The use of the guide system may be beneficial to assist engagement of the removable portion(s) (103) to the permanently attached portion (102).

Figure 20:
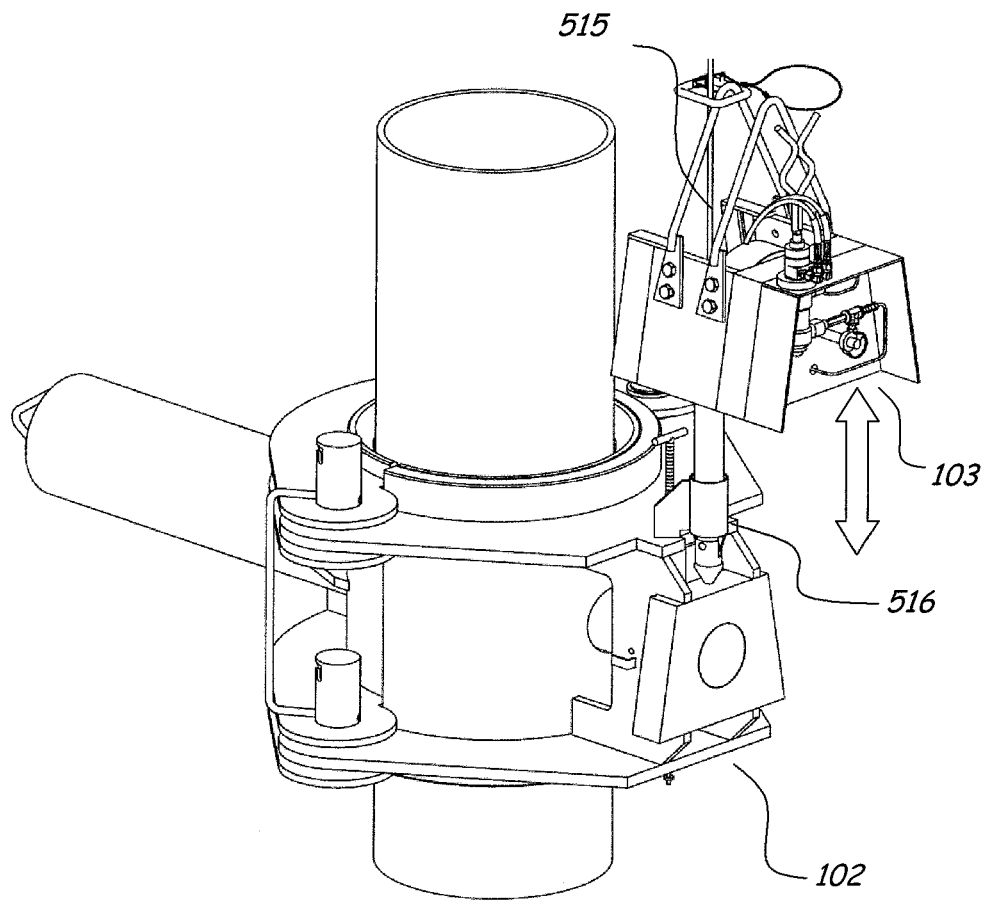
FIG. 20 is a similar perspective view as FIG. 19 but showing the removable portion(s) being lifted from the permanently attached portion using the guide wire system.

An embodiment illustrated by FIG. 20 shows the removable portion(s) (103) being lifted from or lowered onto the permanently attached portion (102) using the guide wire (515) to slidably guide the removable portion(s) (103). Such a lift may be made, for example, by using a crane, diver, or ROV.

Figure 21:
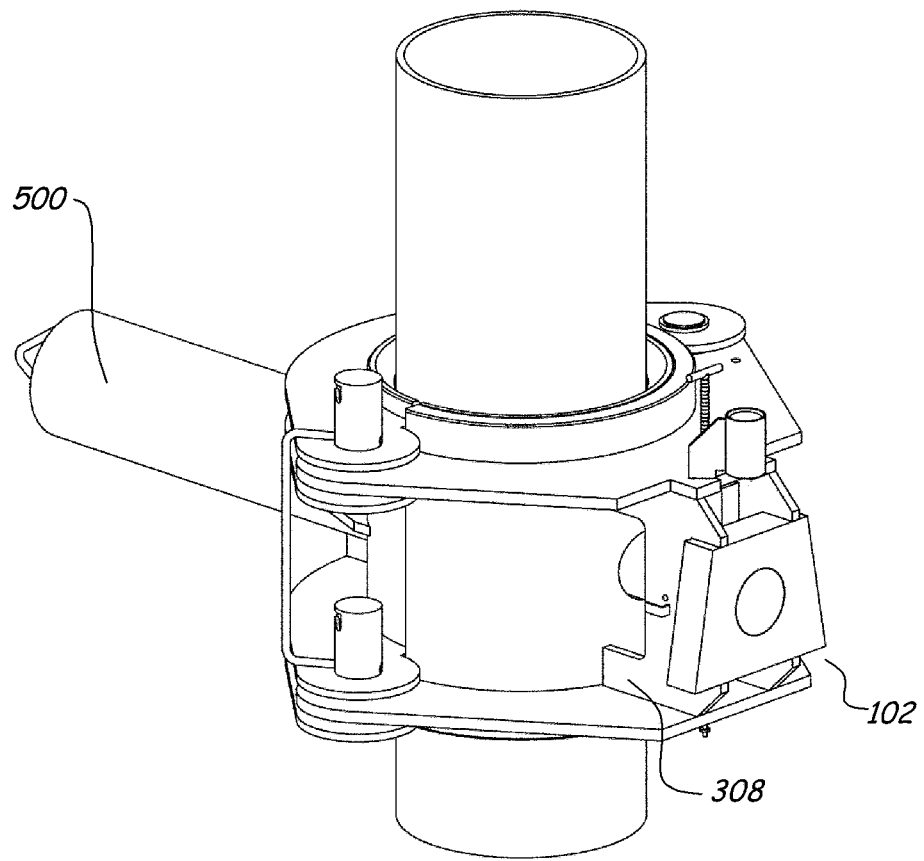
FIG. 21 is a similar perspective view as FIGS. 19 and 20 but showing the removable portion(s) removed and the guide system also removed.

An embodiment illustrated by FIG. 21 is a perspective view of the embodiment illustrated by FIG. 20. Here a clamping arrangement is shown with the removable portion(s) removed and the guide system also removed, and the permanently attached portion (102) visible. In this embodiment the tubular member (500) may be a clamp support member that may allow the fixed half of the clamp to be attached to a main structure. This member may be either welded directly to the main structure or be clamped to the main structure via a separate clamp arrangement, for example a similar clamp arrangement as disclosed herein. The clamped member (2) may be a structural member or a pipe used to carry process fluid and that the clamp arrangement described is a means to attach the member or pipe (2) to a main structure; this may apply to all embodiments disclosed herein.

Figure 22:
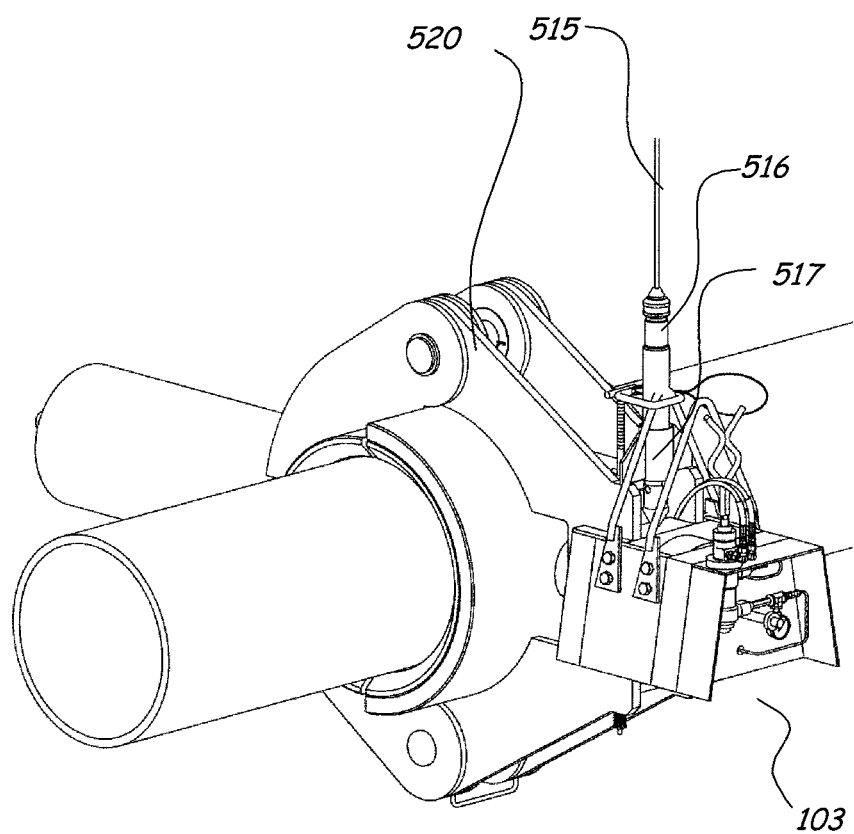
FIG. 22 is a perspective view from above of an embodiment of the outer tubular in the form of a two part hinged clamp orientated in the near horizontal.

An embodiment illustrated in FIG. 22 is a perspective view from above of an embodiment of the outer tubular in the form of a two part hinged clamp orientated, for example, roughly in the near horizontal plan. The clamp is set in the closed position with the inner tube tubular set within. The removable portion(s) (103) is shown mounted on the permanently attached portion (102) and the guide wire (515) is shown attached to the guide anchor set within the guide anchor receptacle. In this embodiment, as well as other embodiments, the wing plates (best seen in FIG. 21—item 308) becomes part of the hinge stiffener plates (520).

Figure 23:
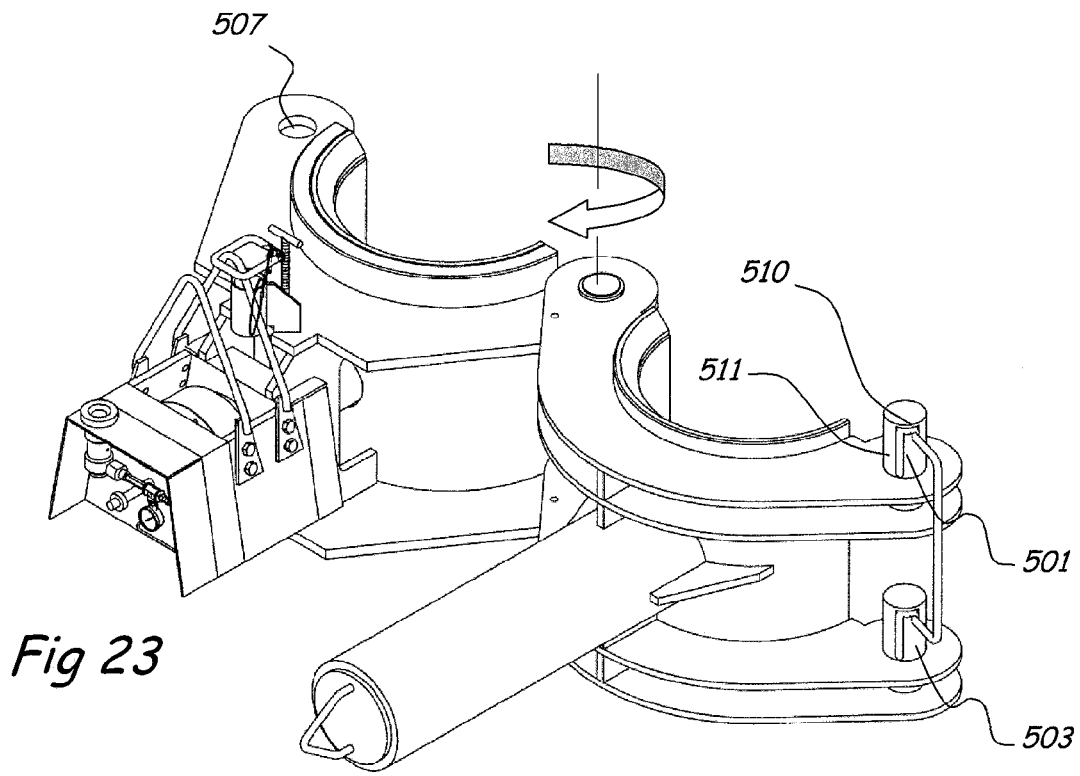
FIG. 23 is a reverse view of FIG. 17 with a vertically orientated clamp in an open position.
Figure 24:
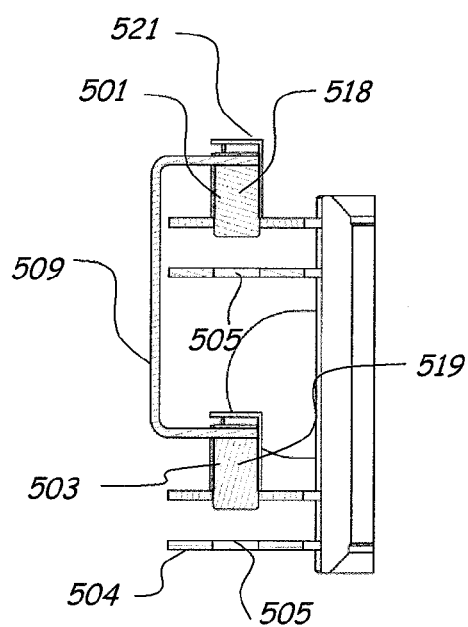
FIG. 24 shows a cross sectional view through the moveable pins.

FIG. 23 shows a reverse view of the embodiment illustrated by FIG. 17 with a vertically orientated clamp in an open position. FIG. 24 illustrates a cross sectional view through the moveable pins (518 and 519) in the open position. The pins are shown in the raised position above the pin holes (505) within the horizontal stiffeners of the fixed half of the clamp. As the clamp is open the pins are not engaged with the nesting upper and lower mating plate (506) that forms part of the movable clamp horizontal stiffener and as such the clamp half shells are not locked together. The movable pins (518 and 519) are attached via a pin handle (509) allowing the pins to be engaged simultaneously, for example, using a ROV or a diver. The movable pins (518 and 519) are held within the pin guides (501 and 503) and sleeve top plate (521). The pins (518 and 519) are close fitting to pinholes (505 and 507) and may have a tapered base to assist engagement. The guides (501 and 503) have slots (510 and 511) to allow the pins (518 and 519) to be withdrawn and located in a docked position whilst disengaged.

Figure 25:
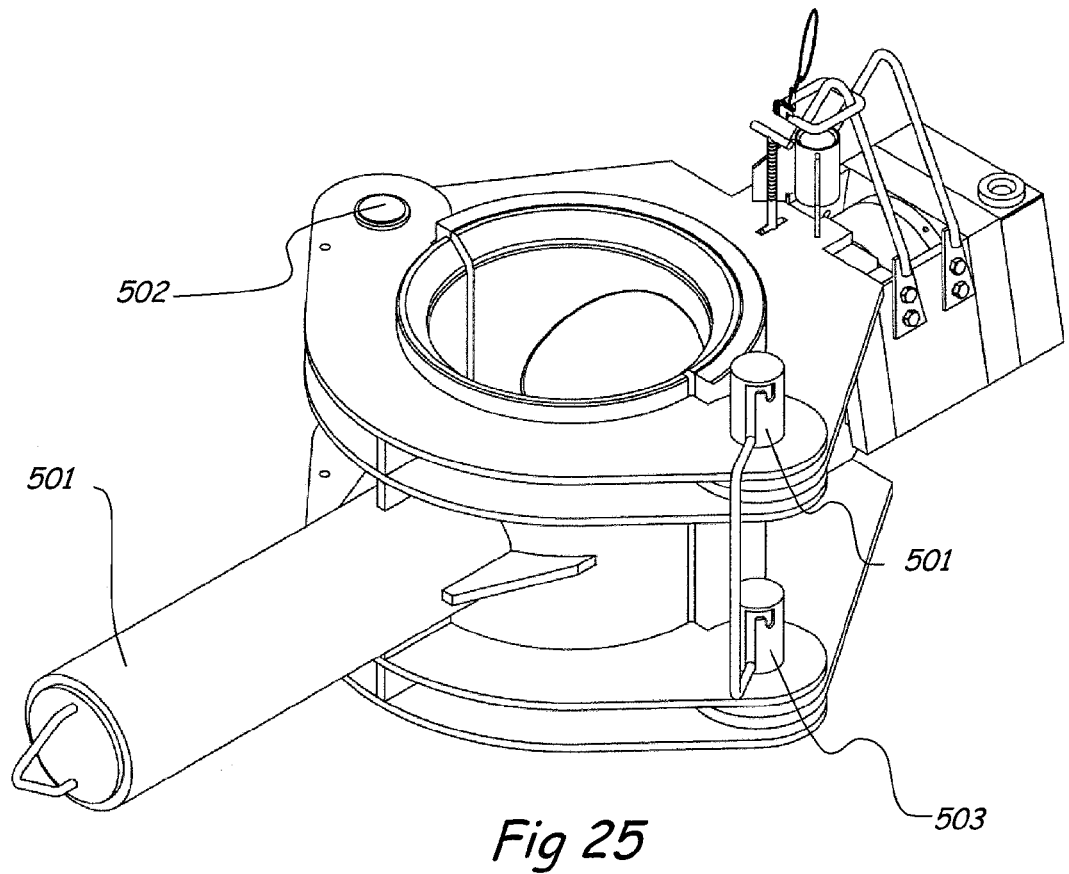
FIG. 25 is a reverse view of FIG. 17 with a vertically orientated clamp in a closed position.
Figure 26:
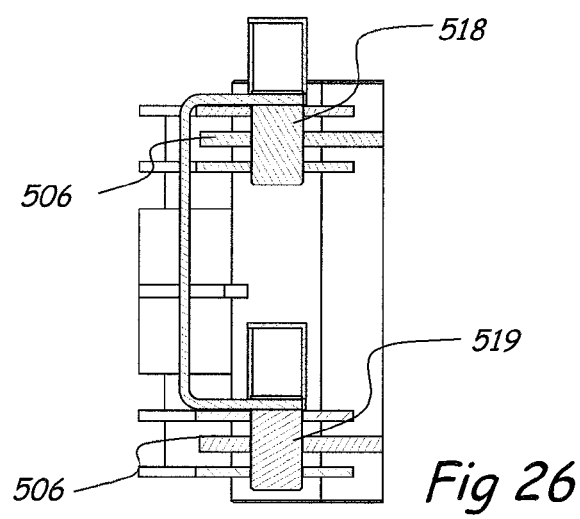
FIG. 26 shows a cross sectional view through the moveable pins.

An Embodiment illustrated by FIG. 25 is a reverse view of the embodiment illustrated by FIG. 17; a vertically orientated clamp in a closed position. FIG. 26 illustrates a cross sectional view through the moveable pins (518 and 519). The pins are shown in the lower position and penetrate the holes (505) of the horizontal stiffeners of the fixed half of the clamp and penetrate the holes (507) of the horizontal stiffeners of the movable half of the clamp. As the clamp is closed the pins are also engaged with the nesting upper and lower mating plate (506) that forms part of the movable clamp horizontal stiffener and as such the clamp half shells are now locked together and therefore able to resist the application of clamp load.

Figure 27:
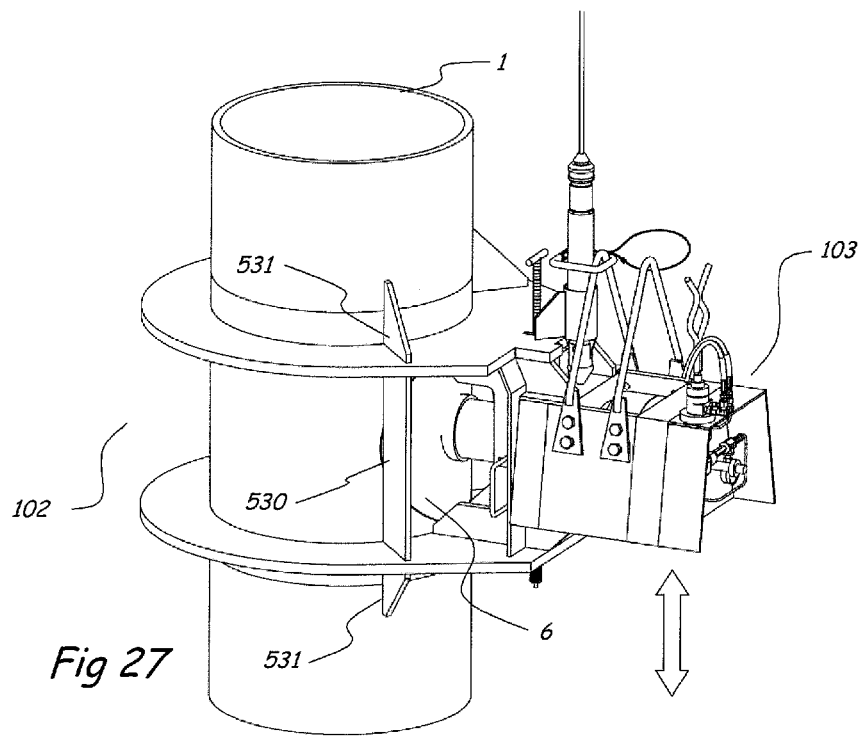
FIG. 27 shows a perspective view of an arrangement in which a preferably heavy grooved collar may be attached directly to the outer tubular and may form part of the outer tubular.

FIG. 27 shows a perspective view of one embodiment wherein the permanently attached portion (102) is arranged in a manner whereby the Heavy Collar is attached directly to the outer sleeve thereby avoiding the need for the outer sleeve over the height of the collar. This may allow significant material and fabrication cost savings. It is recognized that the effective removal of a relatively large portion of the outer tubular in the form of pad (6) may adversely affect the strength of the sleeve and as a result heavy radial stiffener plates (530 and 531) are added to reinforce the collar (3). This embodiment without an outer sleeve (1) over the height of the collar (3) may be used in any of the disclosed embodiments herein.

Figure 28:
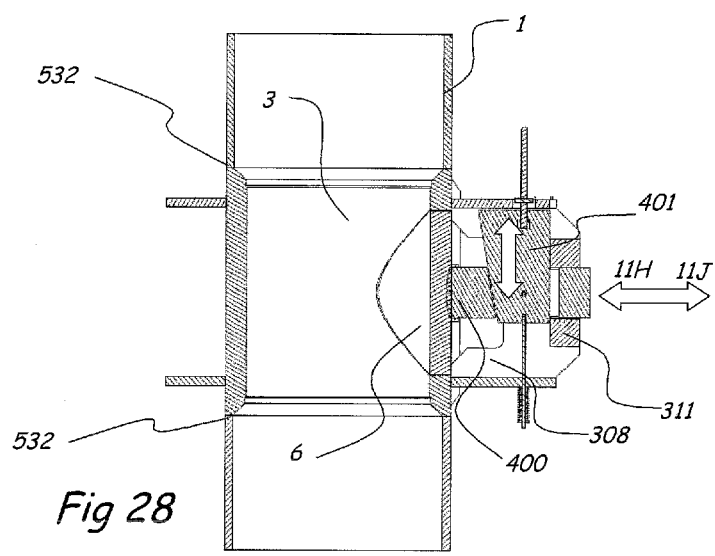
FIG. 28 shows a cross-hatched section through the embodiment of the clamping arrangement of FIG. 27.

FIG. 28 shows a section through the embodiment without an outer sleeve (1) over the height of the collar (3). This illustration shows the attachment of an outer tubular sleeve (1) and collar (3) via circumferential welds (532). The Wedge Plate (401) extends through the Slotted Thrust Bolt (400) and engages the rear reaction plate (311). The collar (3) in this embodiment or in any other embodiment in this disclosure may, or may not, comprise friction increasing means, such as for example grooves, ribs, coating, and/or protrusions, for increasing the holding force of the clamping arrangement. Such friction increasing means may improve the fixing of the first and second members and prevent relative movement between the members.

Figure 29:
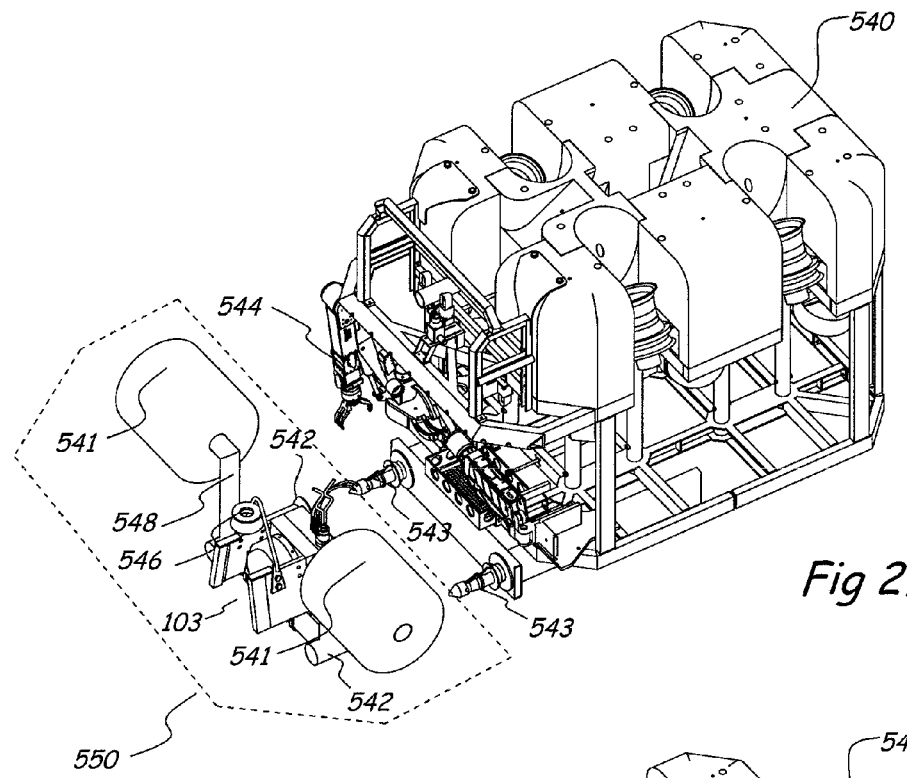
FIG. 29 shows a perspective view of an embodiment comprising a removable portion attachable to a ROV.

An embodiment illustrated by FIG. 29 is a perspective view of an arrangement in which an assembly of elements forms a complete movable tool (550). The movable tool (550) may, for example, comprise the removable portion (103), buoyancy comprising one or more buoyancy units (541), a buoyancy support frame (548), a guide plate/guide cone (546), and probe receptacles (542). The removable portion may, for example, comprise the rear reaction plate (325), wing plates (326), claw plates (327), jack (205), a hydraulic system, and the hotstab.

The movable tool (550) may, for example, able to be deployed by a ROV (540) and maneuvered into position allowing the removable portion (103) to be mated with the fixed portion (102) without the need for assistance of a surface vessel crane. This embodiment differs from the embodiment illustrated in FIG. 1 in that the one or more, preferably two, buoyancy elements (541) are arranged in a compact form so as not to hinder the mating operation by clashing with the permanent structure. The movable tool (550) may be temporarily held by the ROV in a number of ways. The ROV (540) may simply use a manipulator (544) to hold onto a grab a handle (not shown) attached to the movable tool (550) or may, as shown in FIG. 29, use one or more docking probes (543) that may be engaged into receptacles (542) fixed to the movable tool (550). The buoyancy units may be sized to reduce the submerged effective weight of the movable tool (550) to within the capacity of the ROV (540). FIG. 29 shows the movable tool (550) prior to attachment to the ROV (540).

Figure 30:
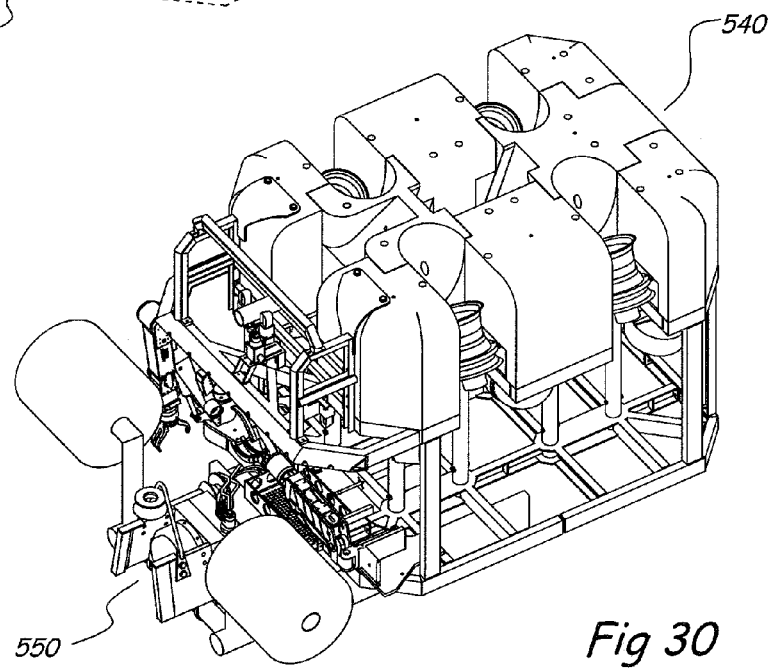
FIG. 30 shows a similar perspective view as FIG. 29 but with the removable portion attached to the ROV.

FIG. 30 shows a similar perspective view as FIG. 29 but with the docking probes (543) engaged within receptacles (542). The movable tool (550) is attached to the ROV (540). This may allow the ROV (540) to move the movable tool (550).

Figure 31:
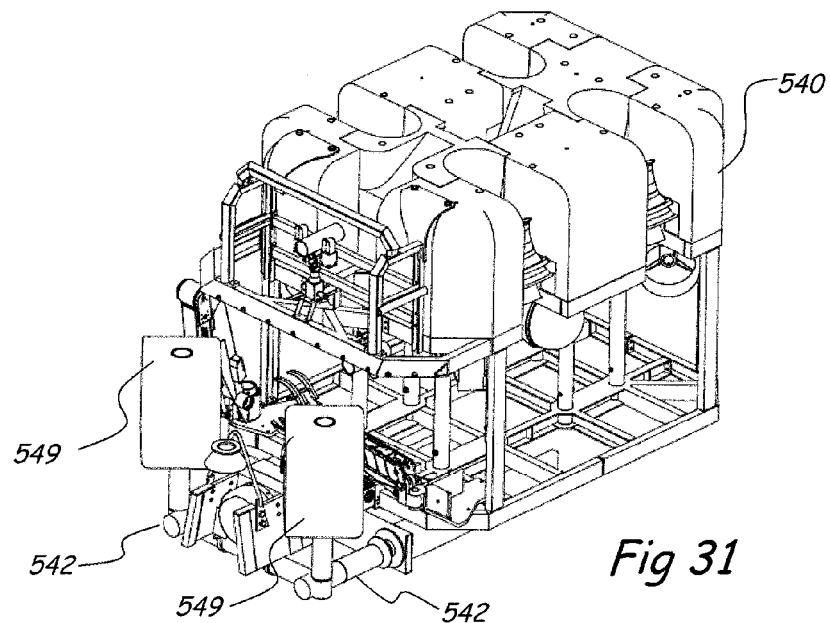
FIG. 31 shows a similar perspective view as FIG. 30 but with rectangular buoyancy units orientated vertically.

An embodiment illustrated by FIG. 31 is a similar perspective view as FIG. 30 but with buoyancy comprising two rectangular buoyancy units (549) orientated vertically. The rectangular buoyancy units (549) may be one or more, and preferably two. The probe receptacles (542) are shown more clearly in this view. The ROV may use one or more docking probes (543) that may be engaged into receptacles (542) fixed to the movable tool (550). The movable tool (550) is attached to the ROV (540). This may allow the ROV (540) to move the movable tool (550) and allows the tool to be "flown to place" independent of any surface vessel assistance.

Figure 32:
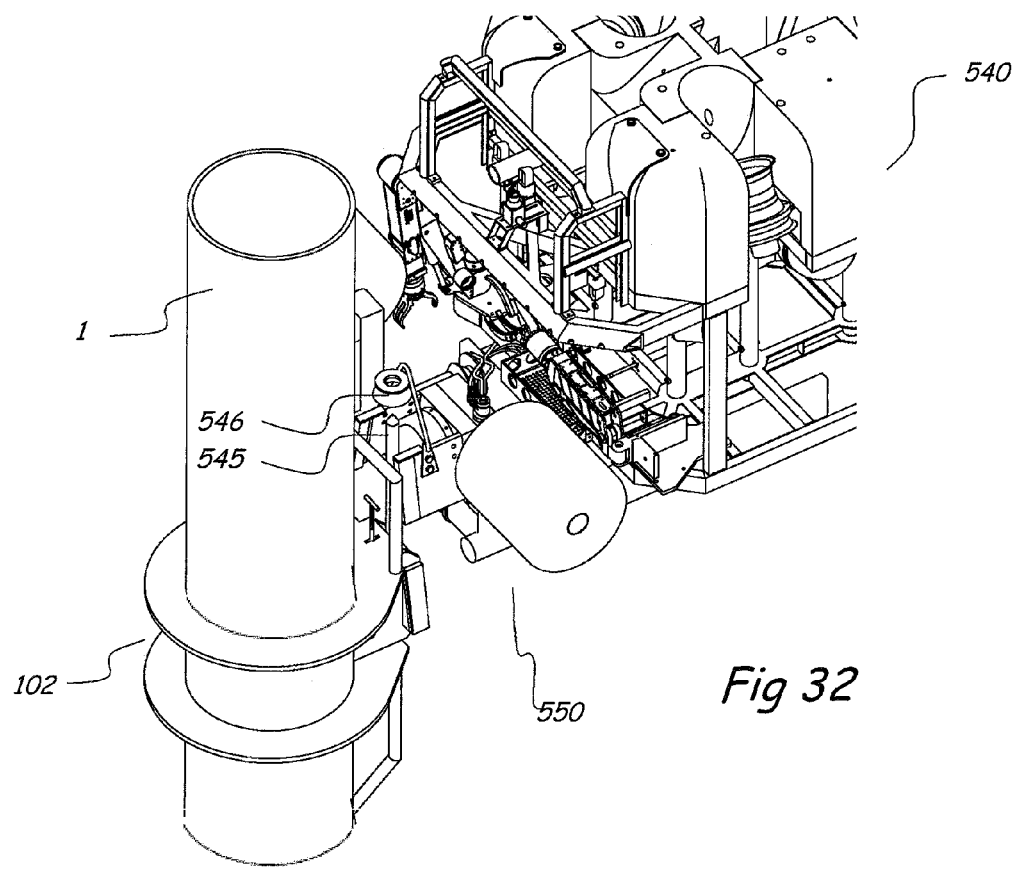
FIG. 32 shows a part view of an embodiment of a ROV and a removable portion close to and above a fixed portion prior to mating.

An embodiment illustrated by FIG. 32 is a part view of the ROV (540) engaged with the movable tool (550) in a position close to and above the fixed portion (102) prior to mating. One or more guide posts (545) may be mounted on the fixed portion (102) and used to assist in alignment of the movable tool (550) to the fixed portion (102). The guide post(s) (545) may be fixed or detachable to the fixed portion (102). The guide post(s) (545) is a rigid guiding portion and is preferably arranged to engage with a guide plate with hole or cone (546) fixed to the movable tool (550) to help align the two during mating. It may be advantageous to make the guide posts removable to reduce costs, as it will be reusable. In one embodiment, removal of the guideposts following connection of the inner tube to the outer tube (1) will reduce the possibility of snagging of ROV control umbilical or tether or cables/wires from fishing equipment. One embodiment may allow the movable tool (550) to be securely fixed to the front of the ROV (540) using bolts or similar.

Figure 33:
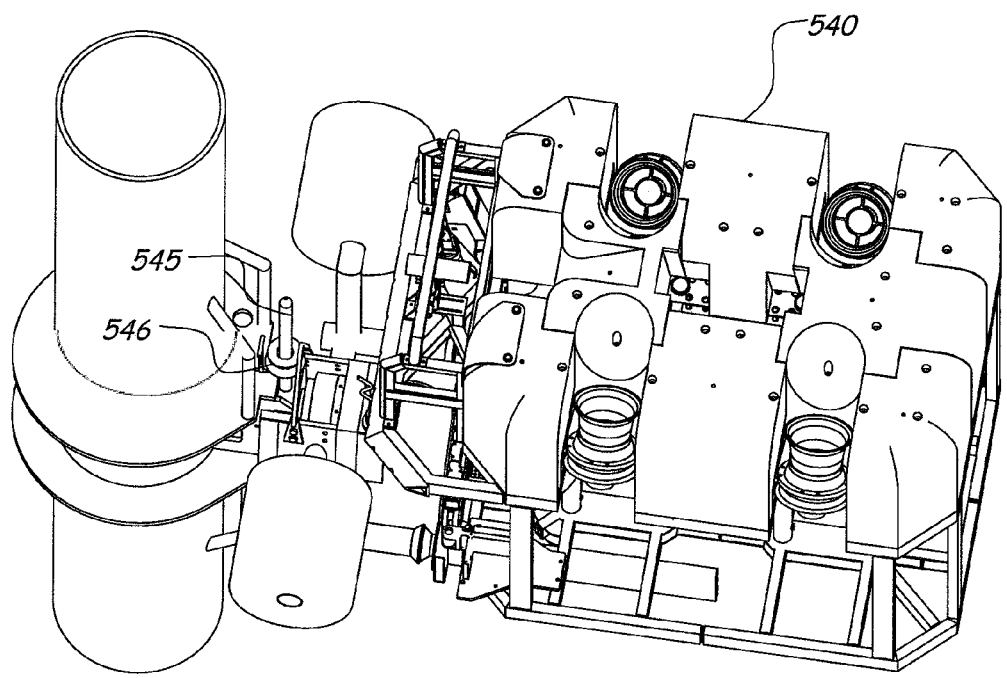
FIG. 33 shows a view of an embodiment from above with a removable portion engaged with a fixed portion.

FIG. 33 shows a view from above of an embodiment comprising the movable tool (550). The movable tool (550) may be fully engaged with the fixed portion (102). The guide post (545) is shown fully penetrating the guide plate with hole or cone (546).

Figure 34:
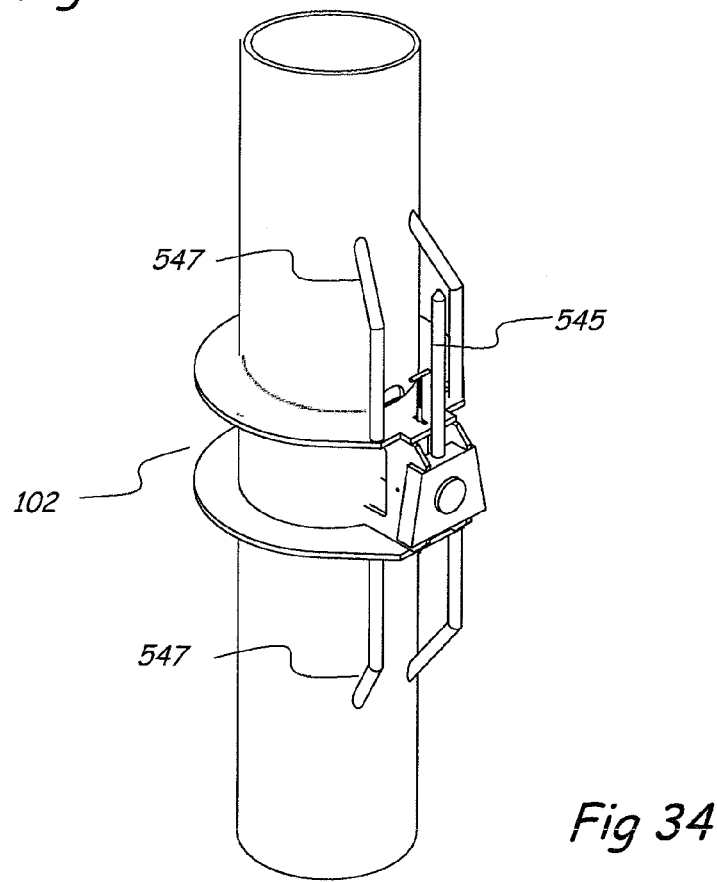
FIG. 34 shows an embodiment of the clamping arrangement without a ROV and removable portion.

FIG. 34 shows a similar view to FIG. 33 but with the ROV (540) and the movable tool (550) removed. The deflector members (547) may be arranged above and below the fixed part (102). These deflectors (547) may be employed to reduce the possibility of snagging of ROV control umbilical or tether or cables/wires from fishing equipment. An exemplary single guidepost (545) is used in the embodiment.

The use of deflector tubular members may be employed to reduce the possibility of snagging in any one of the disclosed embodiments. One or more deflectors may be used in any one of the disclosed embodiments. The use of such deflectors may be employed to reduce the possibility of snagging of ROV control umbilical or tether or cables/wires from fishing equipment.

Figure 35:
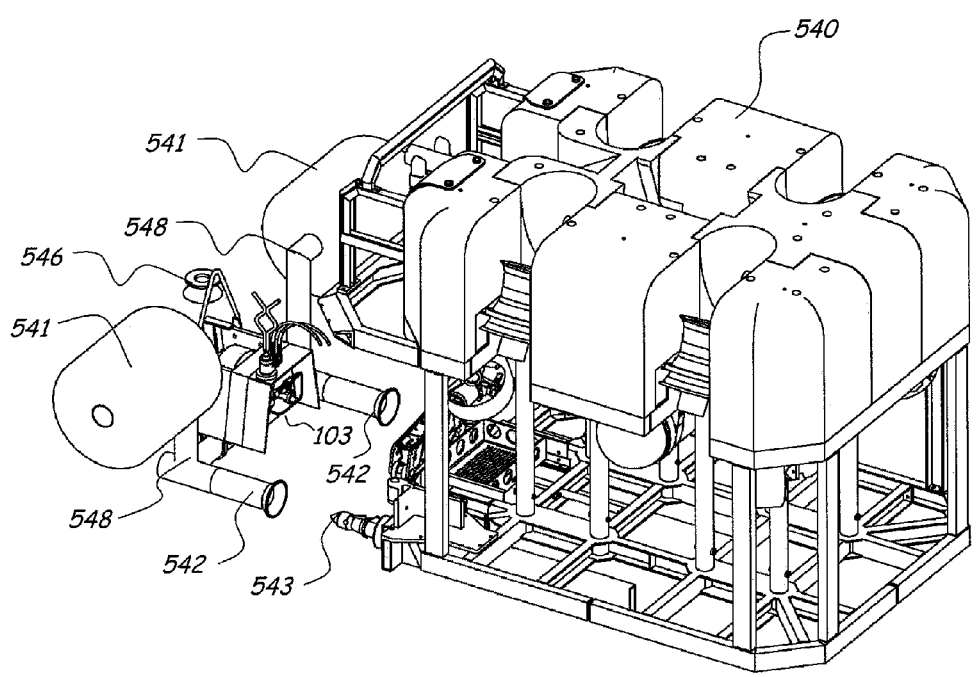
FIG. 35 shows an embodiment of a removable portion attachable to a ROV.

FIG. 35 illustrates an embodiment of a removable portion attachable to a ROV (540). This view is similar to the view in FIG. 29 but from the rear and above. The ROV probes (543) may engage the probe receptacles (542). The guide plate/cone (546) may be fixed to the movable tool (550).

It should be noted that there are a wide variety of alternative possible arrangements whereby the movable portion may be attached to the fixed portion. Examples could involve slots, pins, hooks, tee bars, hydraulically actuated claws, rotating cams, and/or expanding elements within recesses. An important consideration is that the pressure inducing load element and the associated removable reacting means are movable.

At least one of the disclosed embodiments may comprise a pressure intensifier within the hydraulic system. This may increase the delivered pressure from the ROV (nominally 3000 psi) up to a suitable pressure at the hydraulic jack in the range of, for example, 10,000 to 15,000 psi. Such a pressure intensifier may allow, for example, a standard workclass ROV supply pressure to be used. The pressure intensifier may be a small unit approx 200 mm×200 mm×75 mm and may be mounted on the back of the Rear Reaction Plate. Such a pressure intensifier may be used in any one of the disclosed embodiments.

All references to grooved collar within this disclosure may also be considered to equally apply to collars without grooves. The grooves are simply one exemplary means to improve effective friction and therefore enhance axial connector capacity. Similarly references to the fixed portion (102) may be considered to include the locking means, such locking means using for example collar (310) or wedge (401).

The clamping arrangement discussed above fixes two members to each other. The invention, therefore, is well adapted to carry out the objects and attain the ends and advantages mentioned, as well as others inherent therein. While the invention has been described and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The described preferred embodiments of the invention are exemplary only, and are not exhaustive of the scope of the invention. Consequently, the invention is intended to be limited only by the scope of the appended claims, giving full cognizance to equivalents in all respects. Various embodiments of the present application obtain only a subset of the advantages set forth. No one advantage is critical to the embodiments. Any claimed embodiment may be technically combined with any other claimed embodiment(s).

The invention claimed is:

1. An underwater clamping arrangement for fixing at least a first tubular member and a second tubular member together to prevent relative movement between the members along at least a longitudinal axis, the clamping arrangement comprising:
   at least a first tubular member and a second tubular member;
   a collar coupled to an interior of the first tubular member;
   a frame coupled to an exterior of the first tubular member, the frame comprising a mounting plate disposed thereon;
   a thrust bolt coupled to the frame and to a moveable pad or section of the collar, the thrust bolt being actuatable to impart a radially inward compressive force between the moveable pad or section of the collar and the second tubular member when concentrically received within the collar; and a jack assembly comprising:

a pair of opposing reaction plates that are removably attachable to the mounting plate of the frame; and a hydraulic jack removably coupled to the thrust bolt, the jack having a coupling for selective connection to the thrust bolt such that, when connected, the jack applies a clamping force in a direction along a forcing axis substantially perpendicular to the longitudinal axis of the first tubular member and the second tubular member so to fix the first tubular member and the second tubular member together;

the reaction plates and the frame configured to allow the jack to transfer load to the thrust bolt by providing a load path between the jack and the thrust bolt; and wherein the reaction plates and the jack are deployable to and removable from the frame while the clamping arrangement remains clamped.

2. An underwater clamping arrangement as claimed in claim 1, wherein the clamping arrangement comprises a releasable locking means to retain the moveable pad or section of the collar in a loaded state, the locking means associated with the thrust bolt and the frame to maintain the clamping force when locked.

3. An underwater clamping arrangement as claimed in claim 2, wherein the locking means is adjustable.

4. An underwater clamping arrangement as claimed in claim 2, wherein the locking means comprises a moveable part moveable in a direction parallel to or about the forcing axis, the moveable part moveable so as to lock the clamping arrangement.

5. An underwater clamping arrangement as claimed in claim 2, wherein the locking means comprises a moveable part, moveable in a direction perpendicular to the forcing axis, the moveable part moveable so as to lock the clamping arrangement.

6. An underwater clamping arrangement as claimed in claim 5, wherein the locking means is self activating and arranged to maintain a delivered clamping force as the clamping force load increases incrementally, said self activating locking means being wedge shaped.

7. An underwater clamping arrangement as claimed in claim 1, wherein the jack comprises a hydraulically operated cylinder.

8. An underwater clamping arrangement as claimed in claim 7, wherein the jack assembly comprises a spring return member for retracting the hydraulic cylinder following loading, the spring return member comprising a bar passing through an opening of the hydraulically cylinder, the bar being attached at a first end to a retaining plate and a second end projects through a back plate and passing through a spring, the spring return member being arranged such that by applying pressure within the hydraulic cylinder the retaining plate is moved in one direction thereby compressing the spring and when the pressure is released within the hydraulic cylinder the spring moves the retaining plate in the opposite direction.

9. An underwater clamping arrangement as claimed in claim 1, wherein the jack is removable while the reaction plates are attached to the mounting plate of the frame fixed portion.

10. An underwater clamping arrangement as claimed in claim 1, wherein the reaction plates and the jack are removed by moving in a direction perpendicular to the forcing axis.

11. An underwater clamping arrangement as claimed in claim 1, wherein:

the reaction plates are arranged to engage slidably with the mounting plate of the frame; and slidably engaging faces on the mounting plate of the frame and the reaction plates are shaped to encourage self alignment of the reaction plates by an effect of gravity.

12. An underwater clamping arrangement as claimed in claim 1, wherein:

the reaction plates and the frame each comprise inter-engagable hook portions, the hook portion on the reaction plates arranged to engage the hook portion on the frame to retain the reaction plates to the frame; and the reaction plates are retained to the frame by an effect of gravity.

13. An underwater clamping arrangement as claimed in claim 1, wherein the first tubular member comprises two parts which are fixable together so that the second tubular member can be removed laterally from the first tubular member or the first tubular member from the second member, and wherein the frame is attached to one of the two parts.

14. An underwater clamping arrangement as claimed in claim 1, wherein the first tubular member is attached axially to each end of the collar such that the collar does not sit concentrically within the first tubular member and the collar being supported by one or more ring stiffeners to which the frame is attached.

15. An underwater clamping arrangement as claimed in claim 1, wherein:

the reaction plates and the jack are removably arranged to the frame by means of a ROV; and the reaction plates and or the jack is or are provided with buoyancy via at least a buoyancy unit.

16. An underwater clamping arrangement as claimed in claim 1, wherein the frame of the clamping arrangement comprises a movable pad associated with the thrust bolt, wherein a dimension of the movable pad in a plane perpendicular to the longitudinal axis is substantially the same as an outer diameter of the second tubular member.

17. An underwater clamping arrangement as claimed in claim 1, wherein:

a guide is attachable to the frame, the guide arranged to extend upwardly;

the reaction plates having a slidable engagement with the guide;

the guide further comprising a substantially rigid guiding portion extending upwardly from the frame;

the reaction plates being provided with a means of engaging with the rigid guiding portion; and the reaction plates being aligned to the frame by engagement with the rigid guiding portion.

* * * * *